United States Patent [19]

Hart et al.

[11] 3,939,552

[45] Feb. 24, 1976

[54] METHOD AND APPARATUS FOR FEEDING A PAIR OF WIRES

[75] Inventors: Granville Spencer Hart; Joseph Edward Brandewie, both of Clearwater, Fla.

[73] Assignee: AMP Incorporated, Harrisburg, Pa.

[22] Filed: Nov. 26, 1974

[21] Appl. No.: 527,512

[52] U.S. Cl. .......... 29/427; 29/203 DT; 29/203 DS; 29/628; 81/9.51

[51] Int. Cl.² .......................................... B23P 19/02

[58] Field of Search...... 29/427, 426, 203 R, 203 D, 29/203 DT, 203 DS, 628, 630 R, 630 A, 203 P, 203 MW; 81/9.51, 9.5 R; 140/1, 140

[56] References Cited

UNITED STATES PATENTS

| | | | |
|---|---|---|---|
| 2,929,284 | 3/1960 | Hagstrand | 81/9.51 |
| 3,267,556 | 8/1966 | Scharf | 81/9.51 |
| 3,604,291 | 9/1971 | Weidner | 81/9.51 |
| 3,626,431 | 12/1971 | Thierri et al. | 29/203 D |
| 3,636,991 | 1/1972 | Webster | 29/630 R |
| 3,653,412 | 4/1972 | Gudmestad | 81/9.51 |
| 3,699,630 | 10/1972 | Tarbox et al. | 29/203 MW |
| 3,766,624 | 10/1973 | Grebe et al. | 29/203 MW |
| 3,769,681 | 11/1973 | Eubanks | 29/203 DT |
| 3,795,962 | 3/1974 | Baldyga | 29/203 D |

*Primary Examiner*—C. W. Lanham
*Assistant Examiner*—James R. Duzan
*Attorney, Agent, or Firm*—William J. Keating; Jay L. Seitchik; Frederick W. Raring

[57] ABSTRACT

A method and apparatus for feeding a pair of wires in which the length of the fed wires may be varied relative to each other and also in which accurate positioning of the wires at the receiving station is accomplished. At the start of a cycle of operation the leading end portions of a pair of supply wires are engaged by wire clamp means immediately adjacent a wire support. The wire clamp means is then moved to an extended position to feed the leading end portions away from the wire support, and as the wire clamp means is being moved to its extended position a bight is formed in one of the wires to vary its length relative to the other wire. A trailing portion of the pair of wires is now cut and the insulation is stripped from the trailing end portions of the cut wires as well as the new leading end portions of the pair of supply wires. Subsequently the wire clamp means deposits the leading end of the pair of cut wires at a wire receiving station and then returns to a retracted position adjacent the wire support to engage the new leading end portions of the pair of supply wires. The wire support means is shiftable between extended and retracted positions and when in its extended position maintains the cut and stripped leading ends in an oriented manner. As the wire clamp means moves to its fully retracted position the wire support is shifted to its retracted position to expose the leading ends of the wires an amount sufficient to be properly grasped by the wire clamp means, the wires being exposed a very short interval of time whereby proper orientation of the wires is maintained with respect to the wire clamp means to insure very accurate engagement of the wires by the wire clamp means. The wire clamp means is of novel construction and is so designed that pairs of wires, which may be of differing diameters, can be accurately engaged at differing spacings between the center lines of the wires. In addition, the cutting and stripping mechanism incorporates novel features.

25 Claims, 27 Drawing Figures

38
34
32
36
D
A
E
110
C
G
B
112
F
12
40
46
42

D
E
F
32
34
A
110
C
B
112
12
40
46
42

D
E
534
538
536
F
32
34
A
110
C
B
112
12

A
B
C
D
E
F
110
112
32a
34a
46
42
44
40
12

A
B
C
D
E
F
110
112
32a
34a
46
44
44
40
12

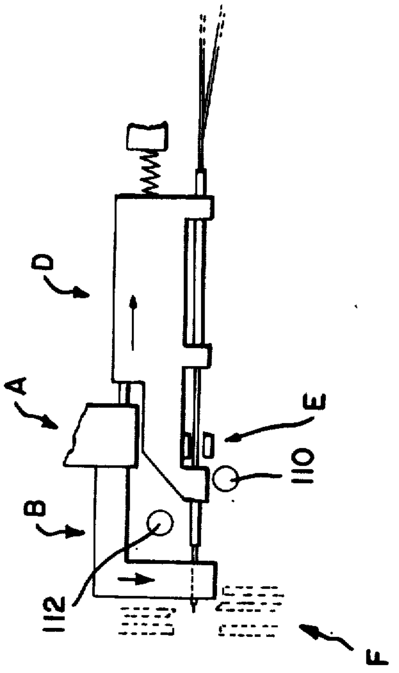
Fig. 9
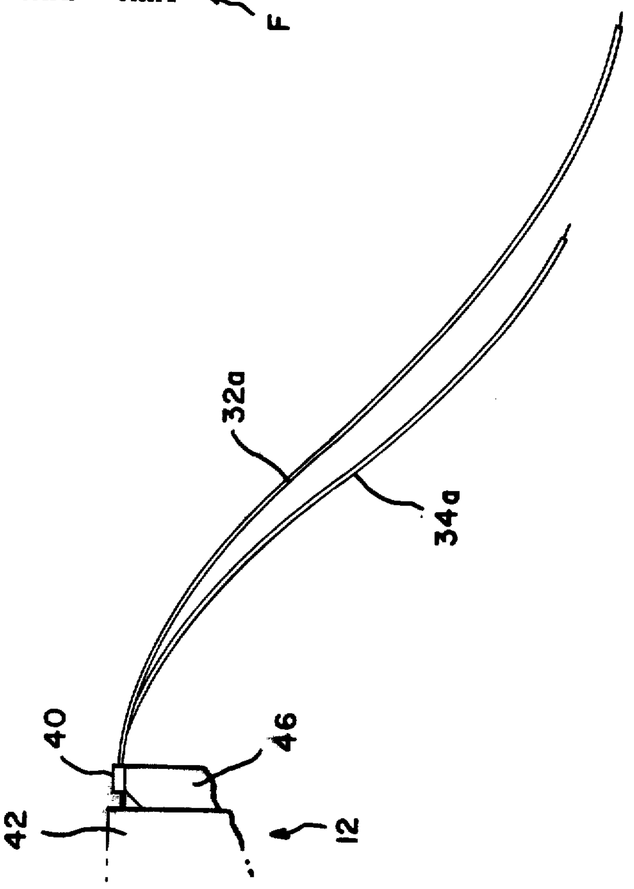

METHOD AND APPARATUS FOR FEEDING A PAIR OF WIRES

FIELD OF THE INVENTION

The present invention relates generally to an in-line processing apparatus and method wherein the leading ends of a pair of cut and stripped wires are delivered to a receiving station for subsequent securement to an electrical sub-assembly. More particularly, the present method and apparatus insures accurate placement of the leading ends at the receiving station, and consequently means are provided to insure accurate pick-up of the wires by the transfer mechanism of the apparatus. In addition, one of the two wires is lengthened relative to the other wire before it is cut from its source of supply.

BACKGROUND OF THE INVENTION

The apparatus disclosed in this application has been designed for an in-line processing system wherein wires are fed from a source of supply, cut, stripped, and accurately positioned at a receiving station for subsequent assembly to an electrical sub-assembly. It has been generally common in the prior art to cut and strip wires of either the same length or of differing lengths and to then batch these cut and stripped wires for subsequent securement to an electrical sub-assembly. Typical examples of this prior art are shown in U.S. Pat. No. 2,929,284 issued Mar. 22, 1960; U.S. Pat. No. 3,267,556 issued Aug. 23, 1966; and U.S. Pat. No. 3,653,412 issued Apr. 4, 1972. While each of these patents is suitable for its intended purpose none of these patents have the capability of feeding the leading ends of wires to a receiving station wherein the wires have been cut from sources of supply and varied in length relative to each other. In addition, none of these patents has the capability of precisely engaging and positioning the leading end of a wire, the leading end to be subsequently associated with an electrical subassembly or the like.

OBJECTS OF THE INVENTION

It is an object of the present invention to provide a method and apparatus for feeding the leading ends of a plurality of wires to a receiving station, the wires being initially interconnected to a source of supply, varying the length of the wires with respect to each other between the leading end and an intermediate portion, and cutting the intermediate portion of the wires whereby wires of differing lengths may be delivered to a receiving station.

It is an additional object of the present invention to provide a method and apparatus for feeding wire wherein the leading or forward end portion of the wire is initially supported on a support in a controlled relationship to maintain proper orientation of the wire, the forward end portion of the wire being subsequently extruded forwardly of the support immediately prior to the time that it is grasped by wire clamping means which transfers it to a receiving station, the forward end portion of the wire having insufficient time to loose its orientation between the time it is extruded out of the support and the time it is grasped by the wire clamping means.

An additional object of the present invention is to provide novel wire clamping means which engage a pair of wires immediately forwardly of a support which slidably supports the wires, the wire clamping means maintaining the wires in accurate relationship with respect to each other.

It is a further object of the present invention to provide improved cutting and stripping means which operate in the path of wire clamp means which transfers the leading end of a wire from a support to a receiving station,the cutting and stripping means including a pair of jaws movable towards and away from each other, the cutting and stripping means initially being moved into an operating position by means which subsequently closes the normally open jaws to cut the wire.

The foregoing objects and other objects and advantages of this invention will be apparent to those skilled in the art after a consideration of the following detailed description taken in conjunction with the accompanying drawings.

BRIEF DESCRIPTION OF THE DRAWINGS

FIG. 9 is a view similar to the preceding Figures and illustrates the completion of a cycle of operation.

11.

Figure 18:
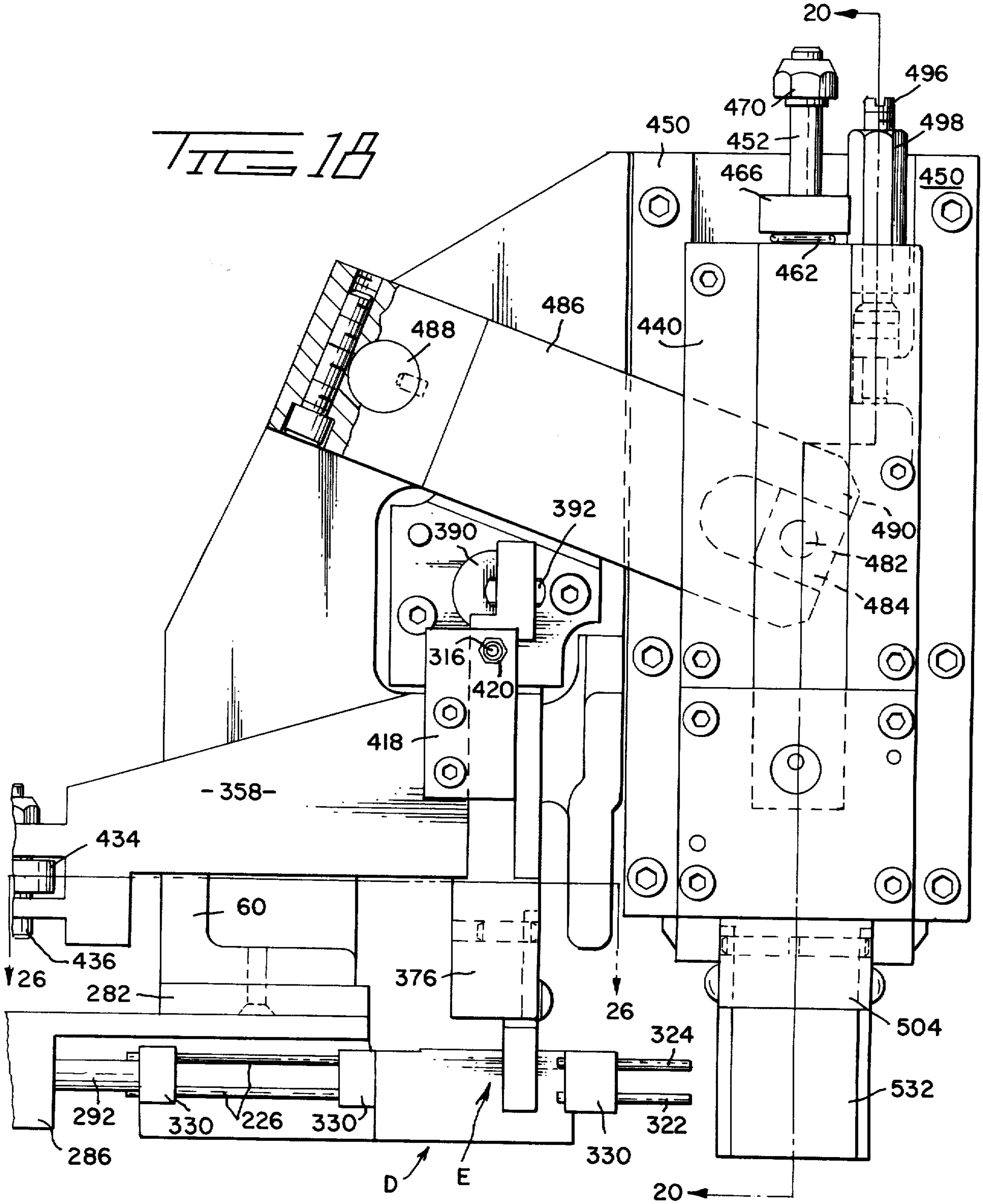
FIG. 18 is a bottom view of the structure shown in FIG. 17, this view illustrating the disposition of the parts when in the FIG. 3 position.
Figure 19:
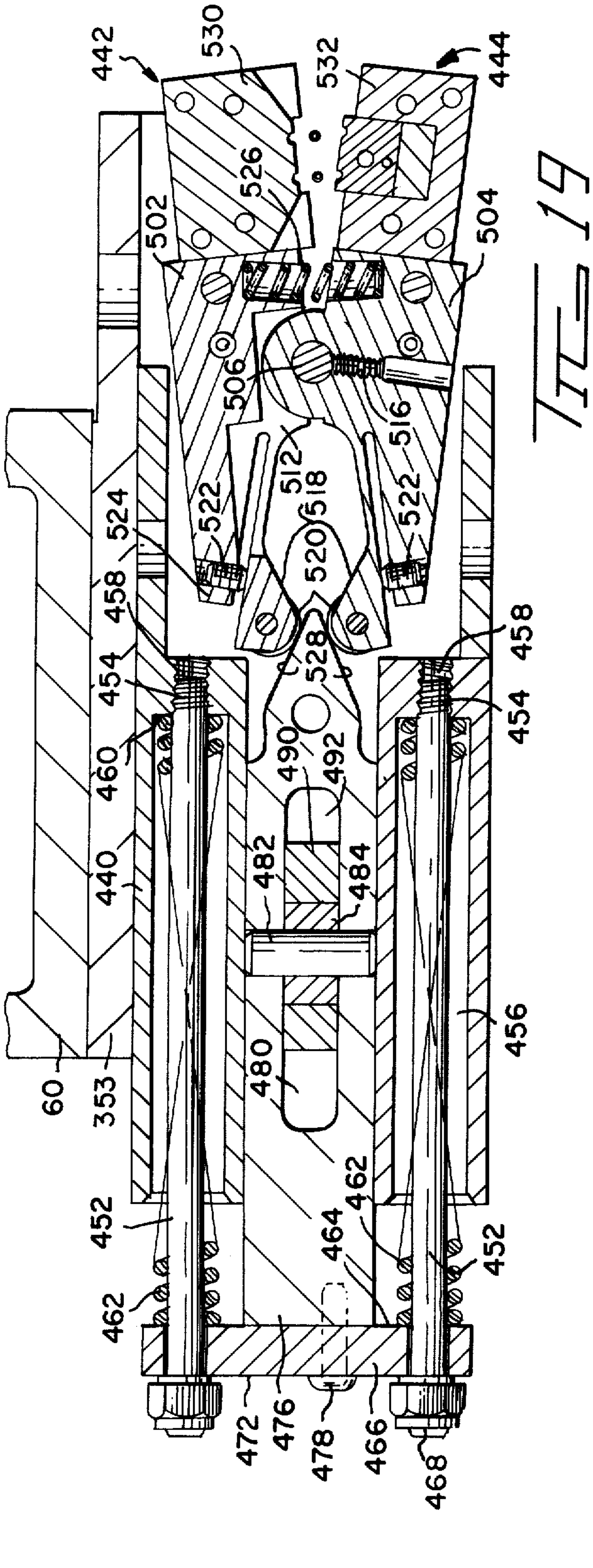
FIG. 19 is a section of the cutting and stripping mechanism taken generally along the lines 19—19 in FIG.
Figure 20:
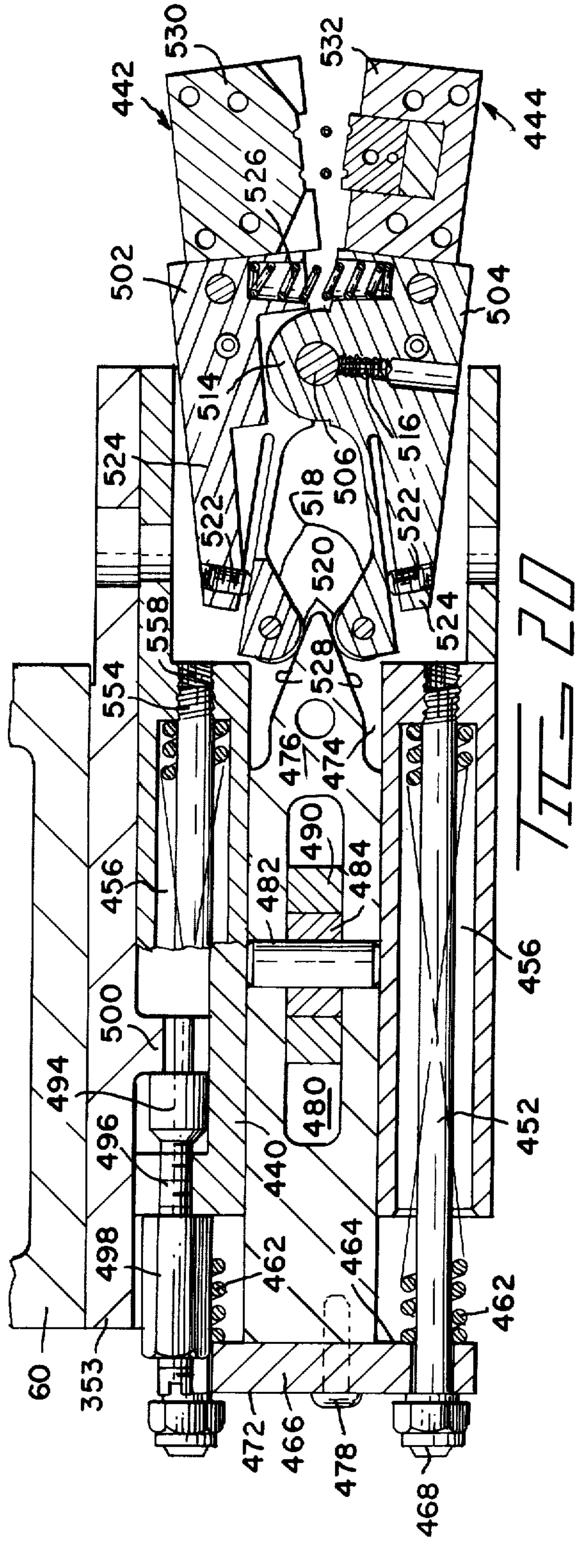

FIG. 20 is a view similar to FIG. 19, this view being taken generally along the lines 20—20 in FIG. 18.

Figure 17:
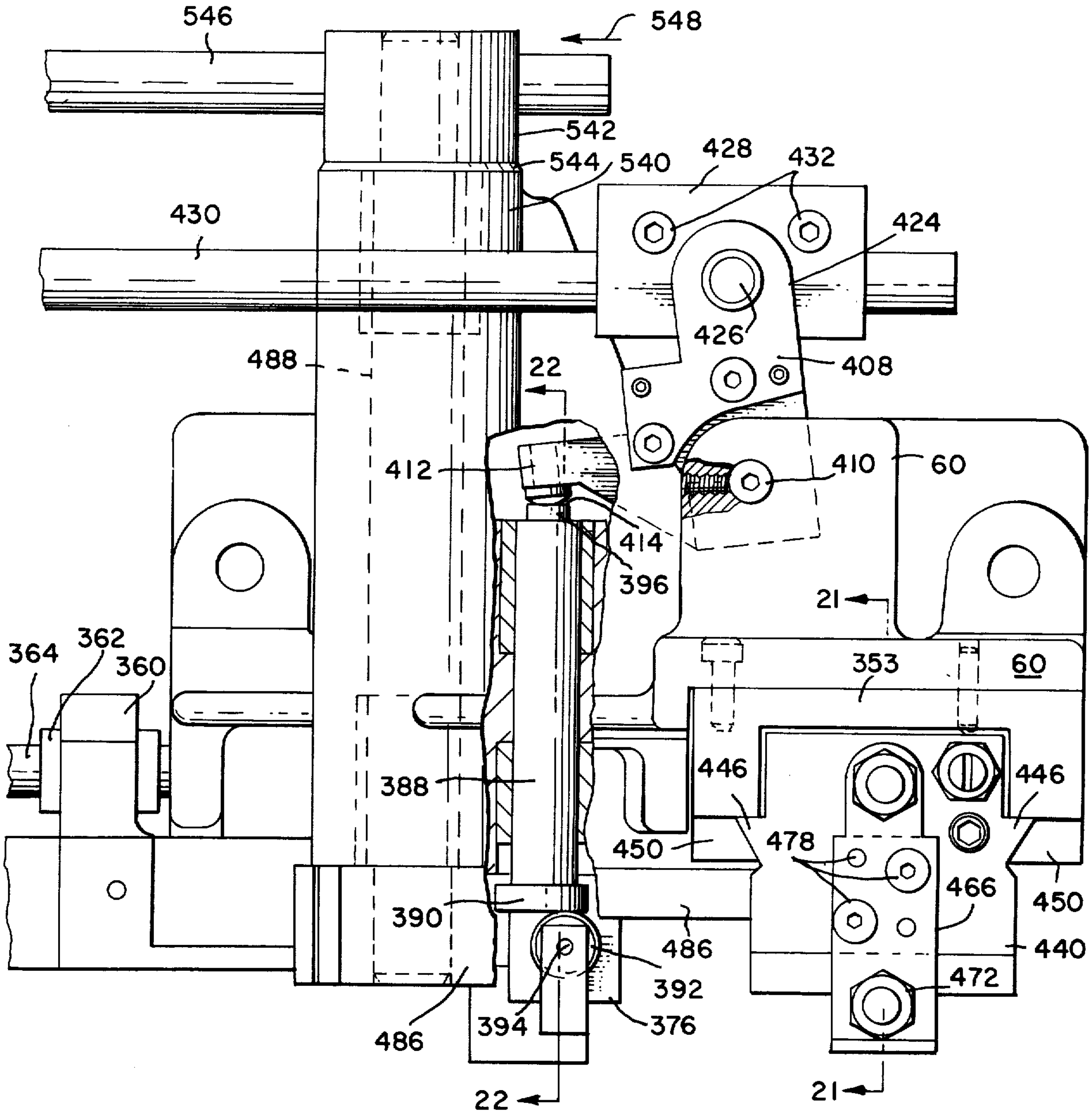
FIG. 17 is a left side view of a portion of the machine shown in FIGS. 10 and 11, this view illustrating the disposition of the parts when they are in their FIG. 4 position.
Figure 21:
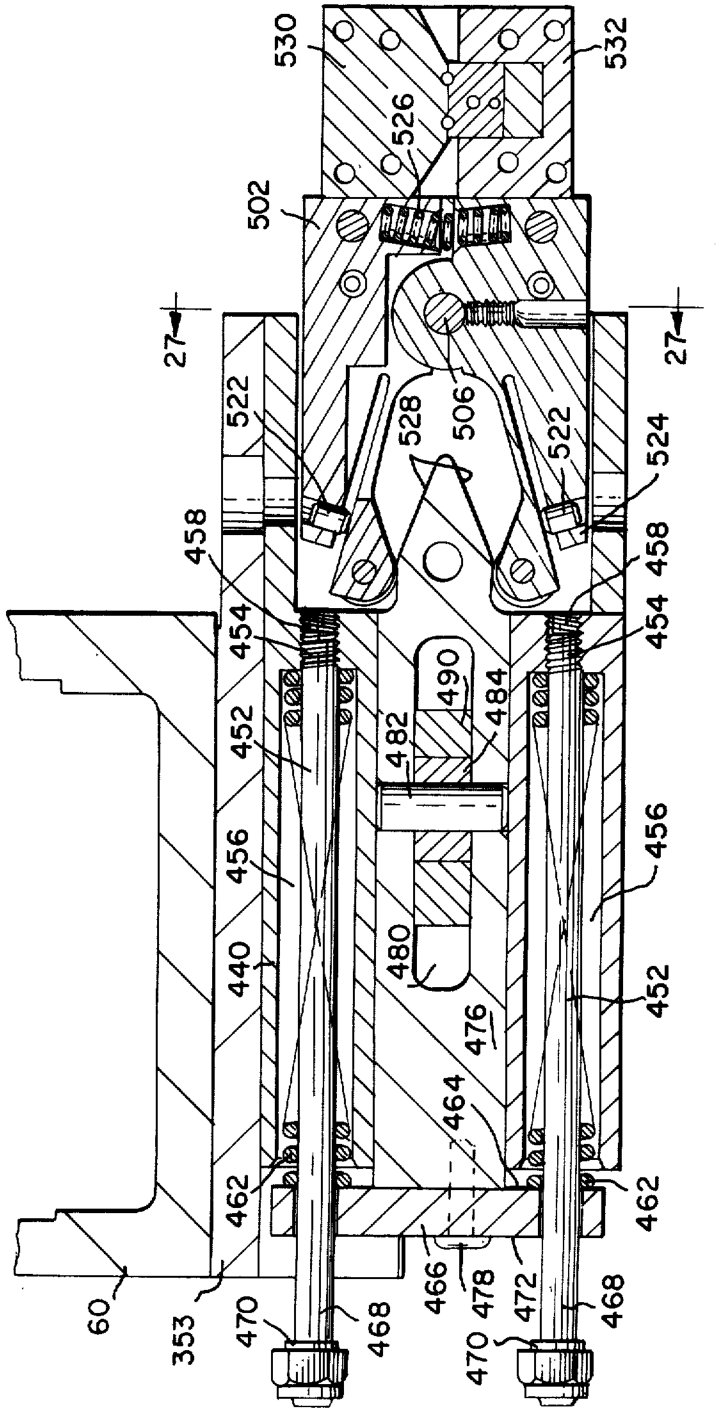

FIG. 21 is also a sectional view of the cutting and stripping mechanism, this view being taken generally along the lines 21—21 in FIG. 17.

Figure 22:
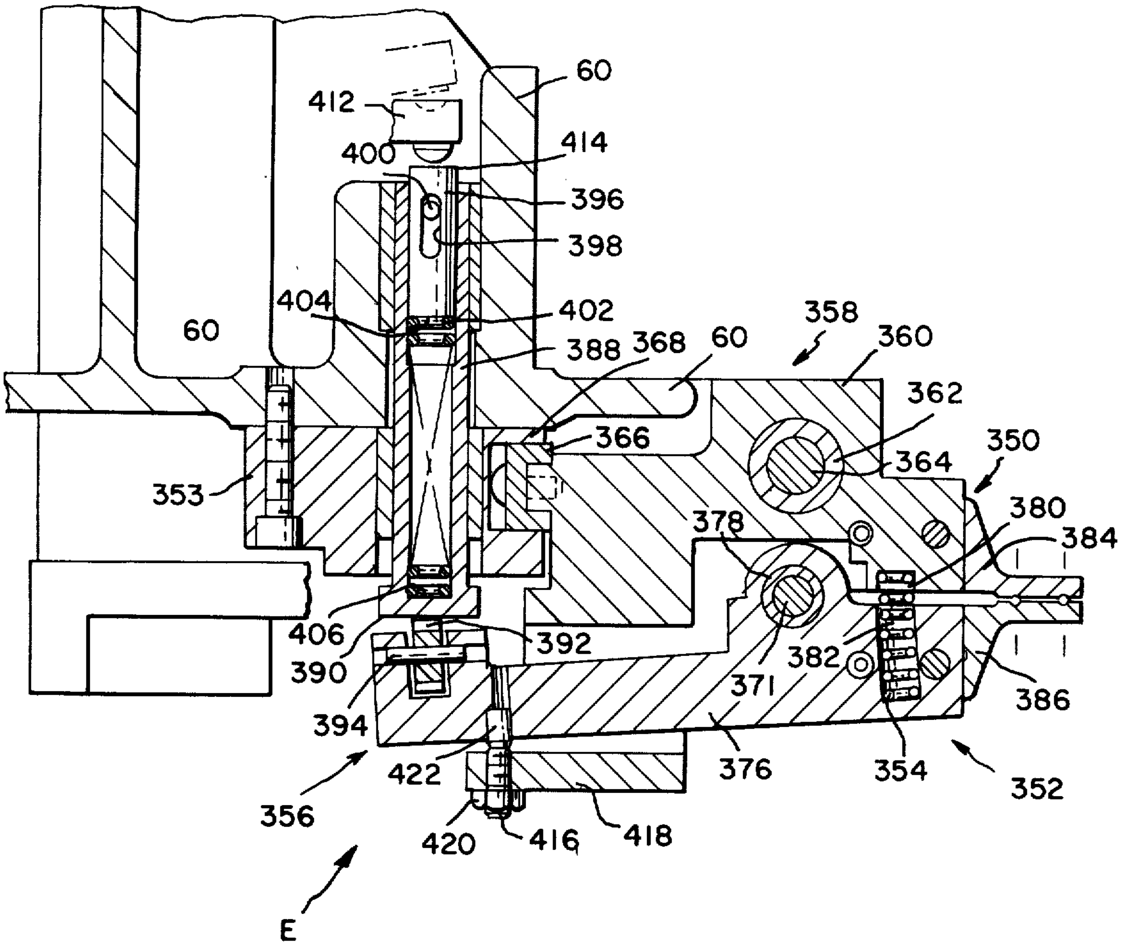

FIG. 22 is a sectional view through the wire gripping means, this view being taken generally along the lines 22—22 in FIG. 17.

Figure 1:
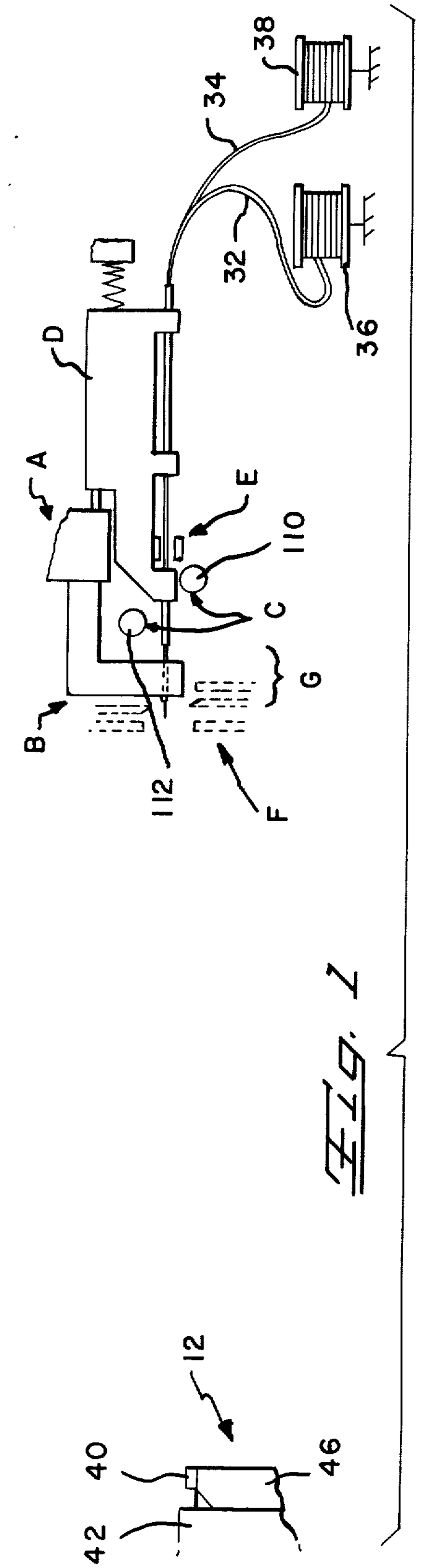
FIG. 1 is a somewhat schematic view illustrating the initial starting position of various sub-assemblies of a machine in which the principles of the present invention are incorporated.
Figure 2:
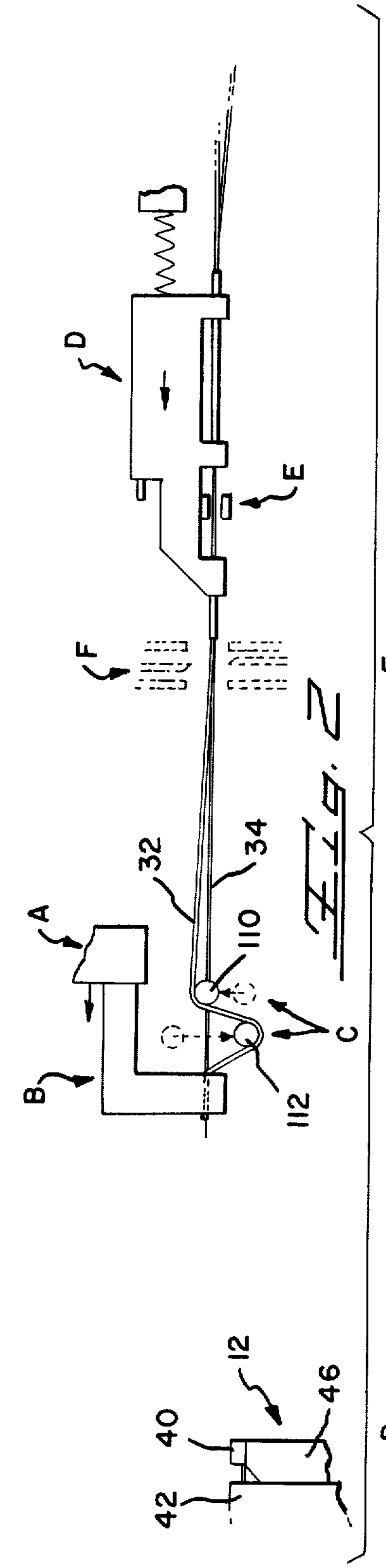
FIG. 2 is a view somewhat similar to FIG. 1 showing the commencement of a cycle of operation.
Figure 23:
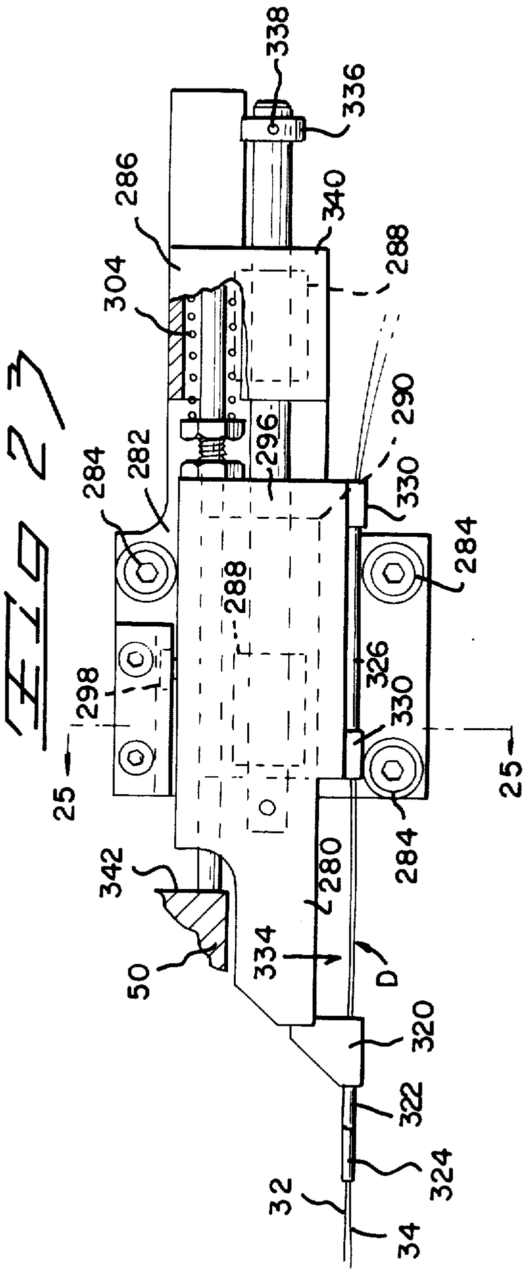
Figure 24:
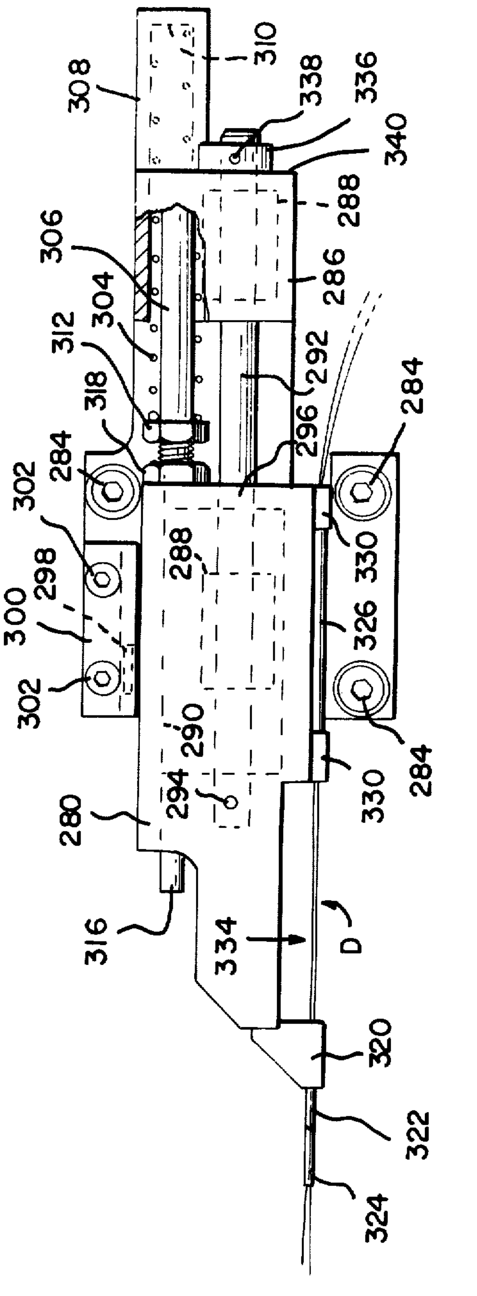

FIGS. 23 and 24 are enlarged right side views of the shiftable support means, FIG. 23 showing the disposition of the support when in the FIG. 1 position, and FIG. 24 showing the disposition of the support when in the FIG. 2 position.

Figure 25:
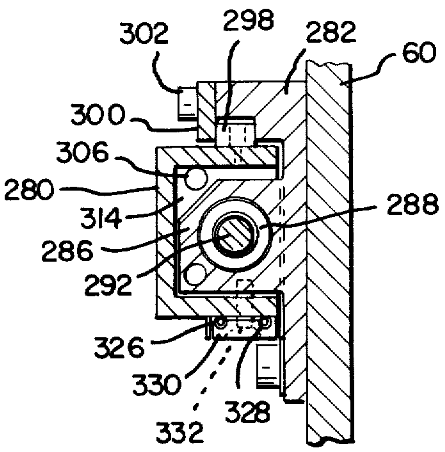

FIG. 25 is a sectional view of the shiftable support means taken generally along the lines 25—25 in FIG. 23.

Figure 26:
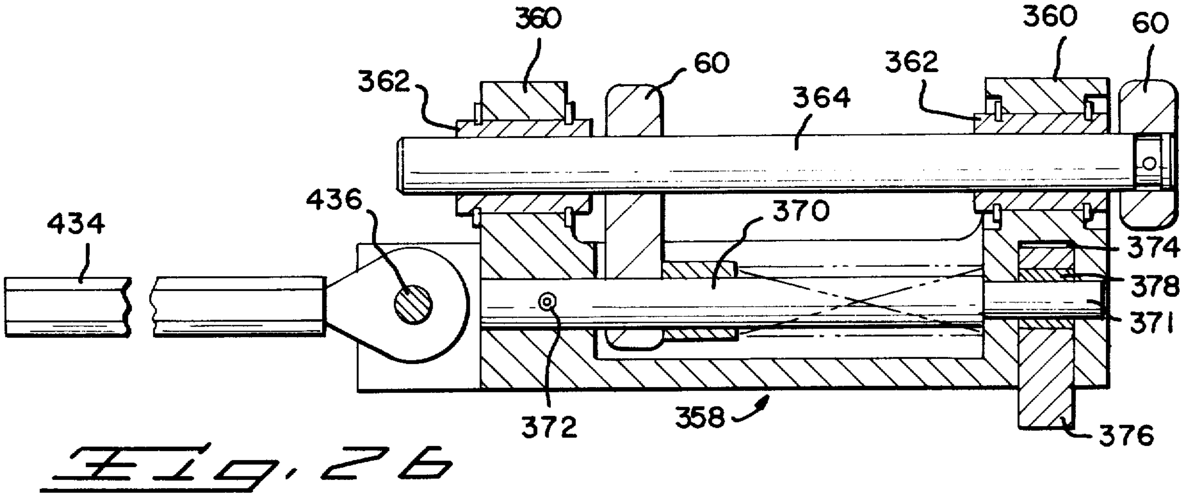

FIG. 26 is a sectional view of the machine taken generally along the lines 26—26 in FIG. 18.

Figure 27:
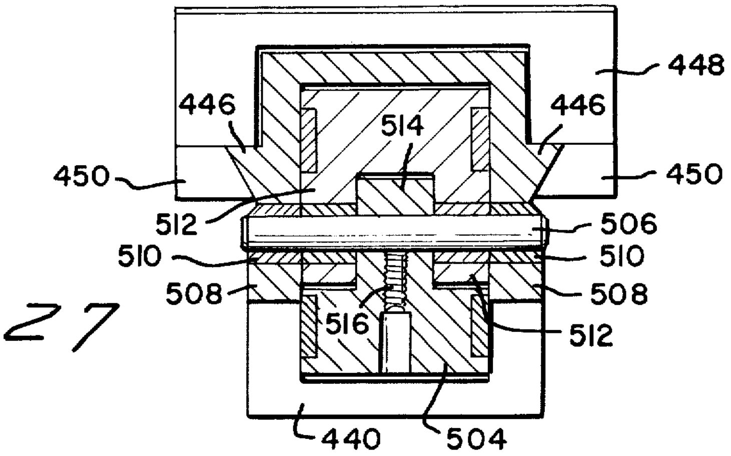

FIG. 27 is a sectional view of the cutting and stripping mechanism taken generally along the lines 27—27 in FIG. 21.

GENERAL DESCRIPTION AND SUMMARY OF OPERATION

Figure 10:
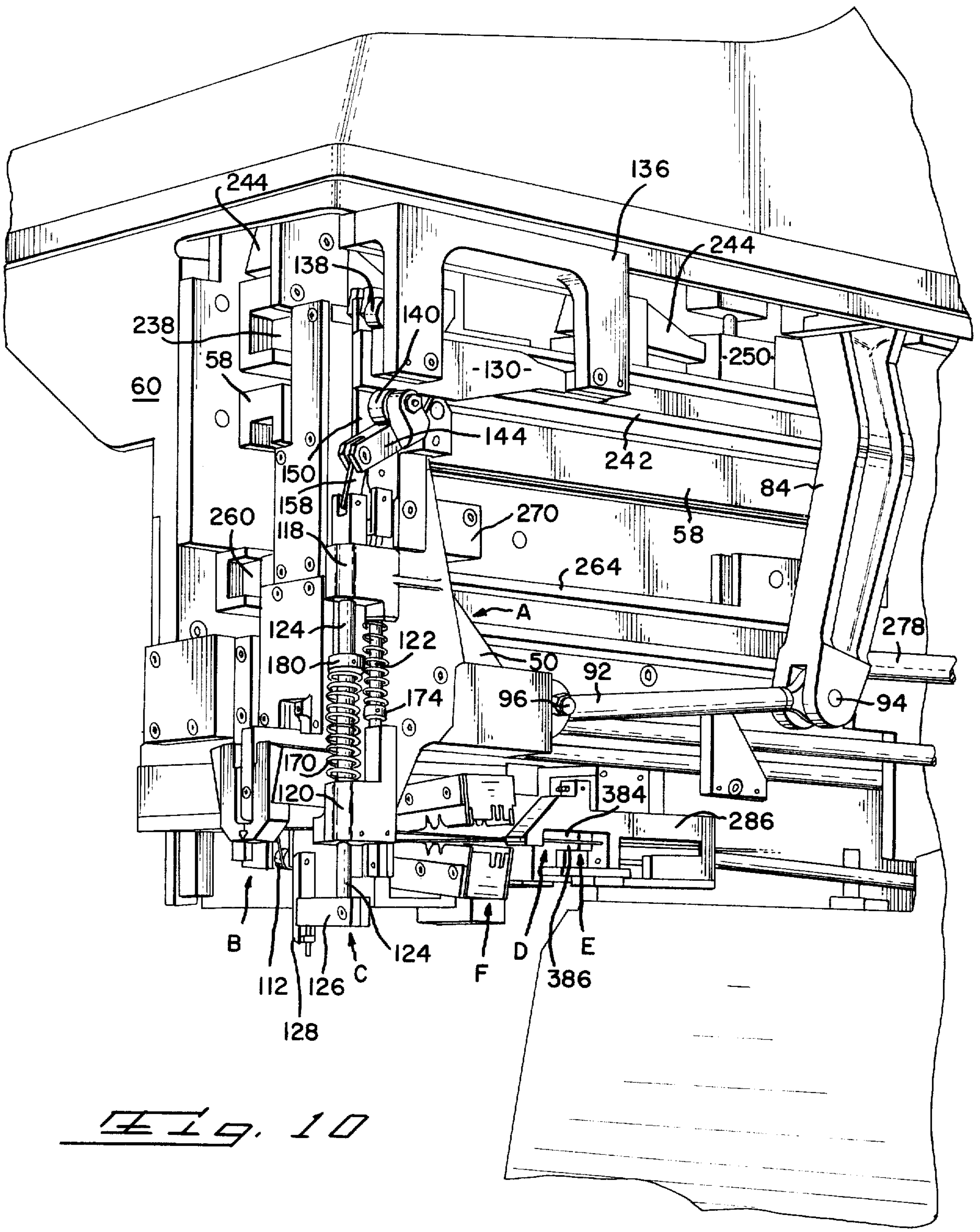
FIG. 10 is a perspective view of a portion of the machine in which the principles of the present invention are incorporated, this view being taken from the right front side and showing the various parts when they are disposed in the FIG. 6 position.
Figure 11:
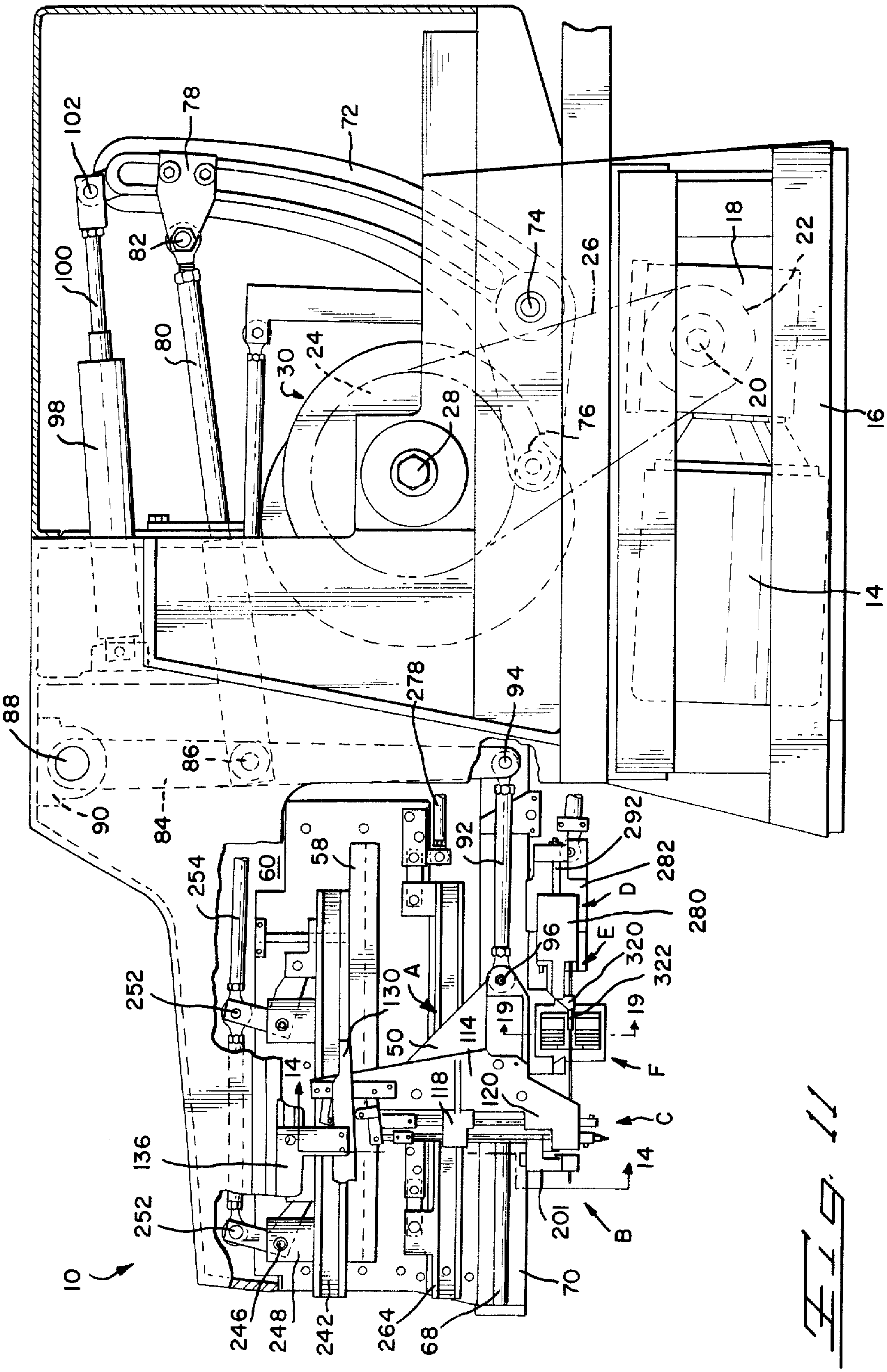
FIG. 11 is a right side view of a machine shown in FIG. 10, various parts being shown in the position they occupy when in the FIG. 2 position.

The machine in which the principles of operation of the present operation are incorporated is indicated generally at 10 in FIGS. 10 and 11, the front end of the machine being disposed adjacent to a receiving station indicated generally at 12 in FIGS. 1 through 9. Various operating sub-assemblies are mounted on the machine, the sub-assemblies operating in such a manner as to cut and strip the leading and trailing ends of a pair of wires, to cause one of a pair of wires to be longer than the other, and to deposit the leading end of a pair of wires at the receiving station for subsequent assembly to an electrical device or the like disposed at the sub-assembly.

The various sub-assemblies carried by the machine include reciprocal carriage means indicated generally at A, the carriage means carrying wire clamp means indicated generally at B and wire engaging means indicated generally at C. Also mounted on the machine is a shiftable wire support indicated generally at D, wire gripper means indicated generally at E, and cutting and stripping means indicated generally at F. Means are provided for driving the various components, the means include a motor 14 mounted in the base frame 16 of the machine, the output shaft of the motor being interconnected with a gear box 18. The gear box 18 has in turn an output shaft 20 about which a sprocket 22 is secured, the sprocket 22 driving a second sprocket 24 by means of a drive chain 26. The second sprocket 24 is fixidly secured to a shaft 28 journalled for rotation in the frame of the machine. The shaft 28 carries a plurality of cams indicated generally at 30, the cams 30 in turn driving the various sub-assemblies through various drive means.

A general summary of an operating cycle of the machine will now be described in connection with FIGS. 1 through 9. FIG. 1 illustrates the disposition of the various parts before a cycle of operation has been initiated. The reciprocal carriage means A is in its retracted position which also causes the wire clamp means B and the wire engaging means C to be in their retracted position. When in this position the shiftable wire support D will be held by the reciprocal carriage means in its retracted position and the leading end of a pair of supply wires 32, 34 will be held in engagement by the wire clamp means in an engaging zone indicated by bracket G. In addition, the cutting and stripping means F will be disposed in a retracted position (indicated by the broken lines) and the wire gripper means E will be disposed in a forward open position. The leading ends of the pair of wires 32, 34 have been stripped in a preceding cycle of operation of the machine, the stripping operation being shown in FIG. 5. The wires 32, 34 extend from a source of supply which may be supply spools 36, 38 mounted in an appropriate manner adjacent the machine.

Figure 3:
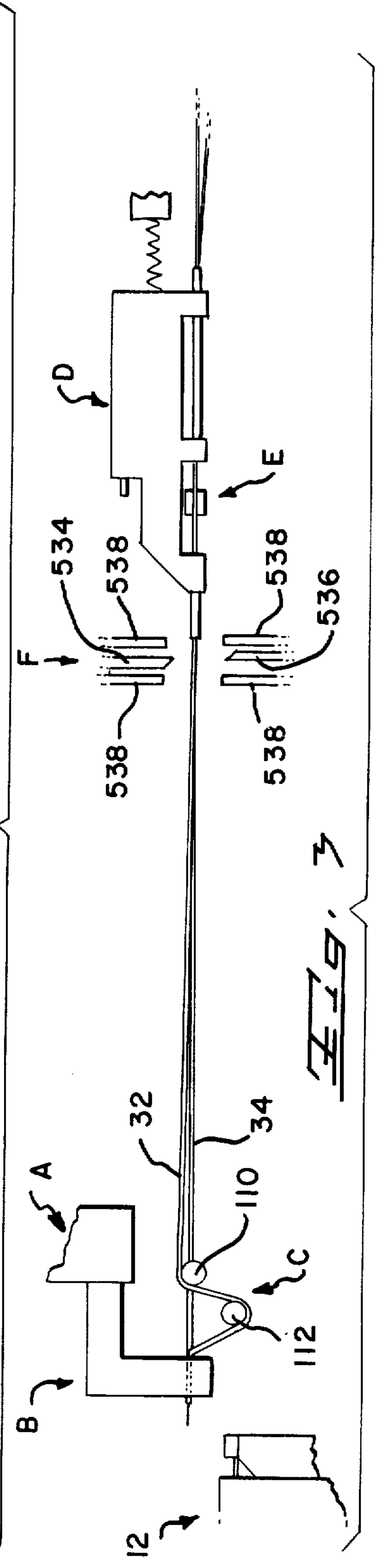
FIGS. 3 through 8 are views similar to FIGS. 1 and 2 and sequentially show various positions of the sub-assemblies during a cycle of operation.
Figure 4:
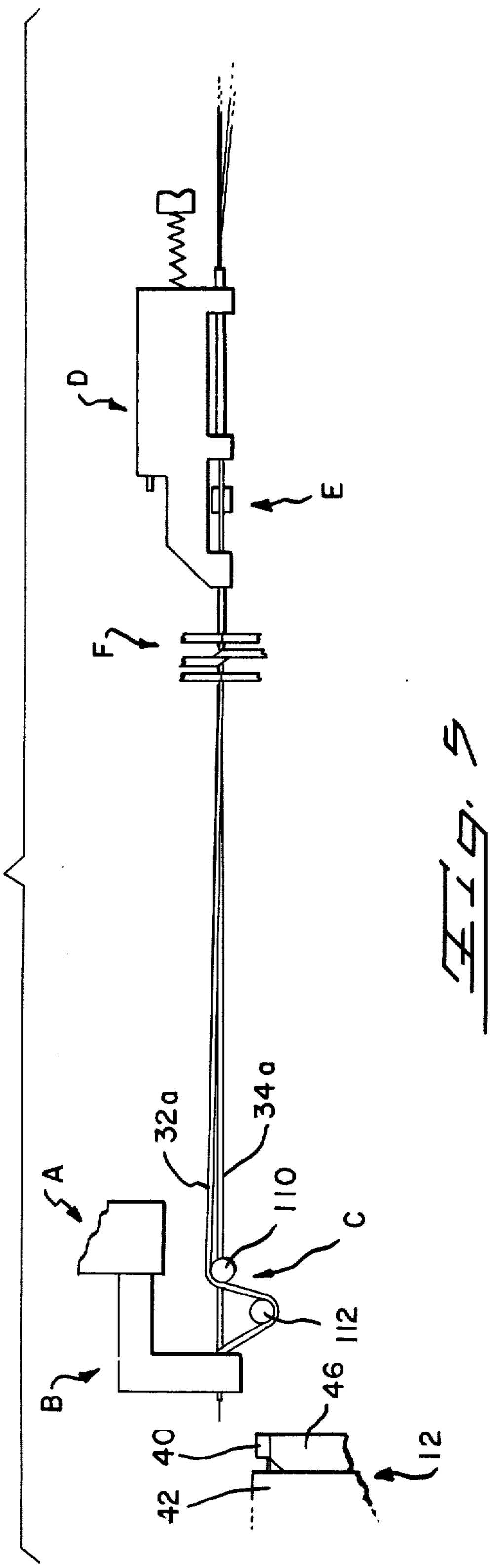
Figure 5:
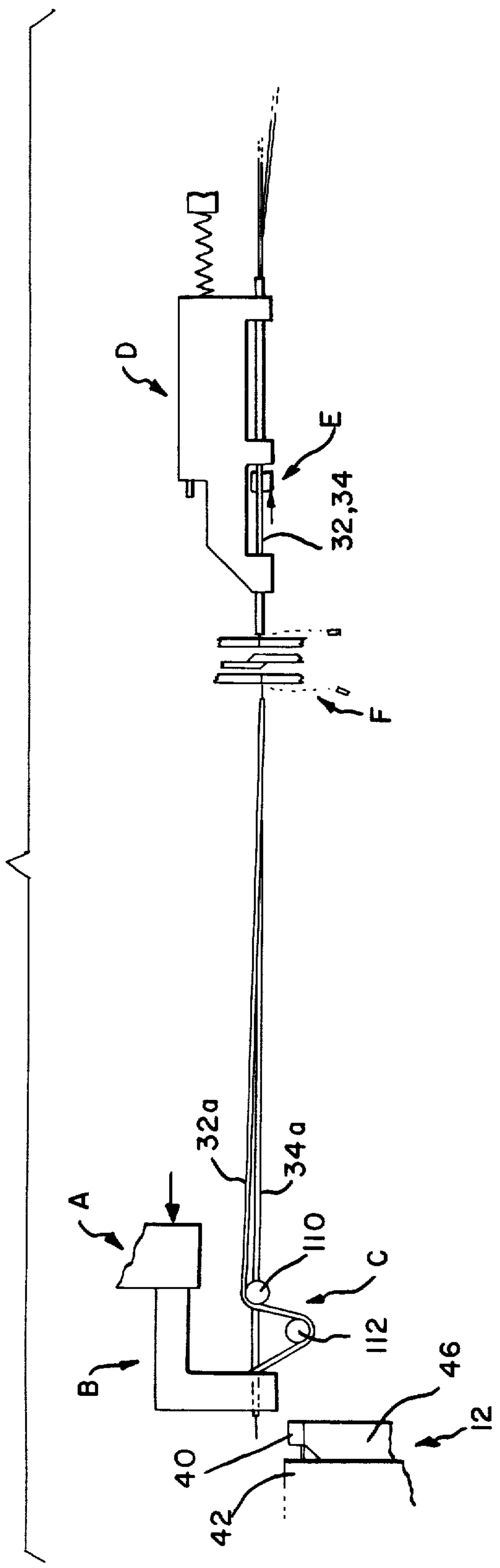

Upon initiation of the operation of the machine the carriage A, and consequently the wire clamp means B, and the wire engaging means C, will be caused to be moved a first amount to the forward end of the machine (to the left in FIG. 3). As the carriage means initially moves away from its retracted position shown in FIG. 1 towards the front of the machine the shiftable wire support D will be moved from its retracted position to an extended position shown in FIG. 2. As the carriage means A is moved further towards the forward end of the machine, wire engaging rollers carried by the wire engaging means C will be brought into contact with a selected wire of the pair of wires to progressively form a bight therein.

As the carriage and wire clamp means approach the receiving station 12 it will be arrested in a first intermediate position shown in FIG. 3 and the cutting and stripping means F will be moved transversely in a direction normal to the length of the wires to the extended position shown in full lines in FIG. 3. At the time the wire clamp means are stopped in their first intermediate position shown in FIG. 3 the wire gripper means E will engage the pair of supply wires 32, 34, this also being shown in FIG. 3. Subsequently, the cutting and stripping means will be closed to the position shown in FIG. 4 to cut the wires 32, 34 adjacent one end of the support D. The cut wires held by the wire clamp means B will now be referred to as cut wires **32*a* and 34*a*, and the wires 32, 34 which are still interconnected to their sources of supply 36, 38, respectively, will be referred to as new supply wires. by moving the carriage means and the wire clamp means forwardly to a second intermediate position and moving the supply wires rearwardly by moving the wire gripper means E from the forward or extended position shown in FIG. 4 to a rear or retracted position shown in FIG. 5 while maintaining the cutting and stripping mechanism in its operating position. As can be seen from FIG. 6** the cut leading end of the new supply wires projects forwardly of one end of the movable support D an amount insufficient to be properly engaged by the wire clamp means, the support means maintaining the leading ends in proper orientation for subsequent engagement by the wire clamp means.

Figures 6, 7:
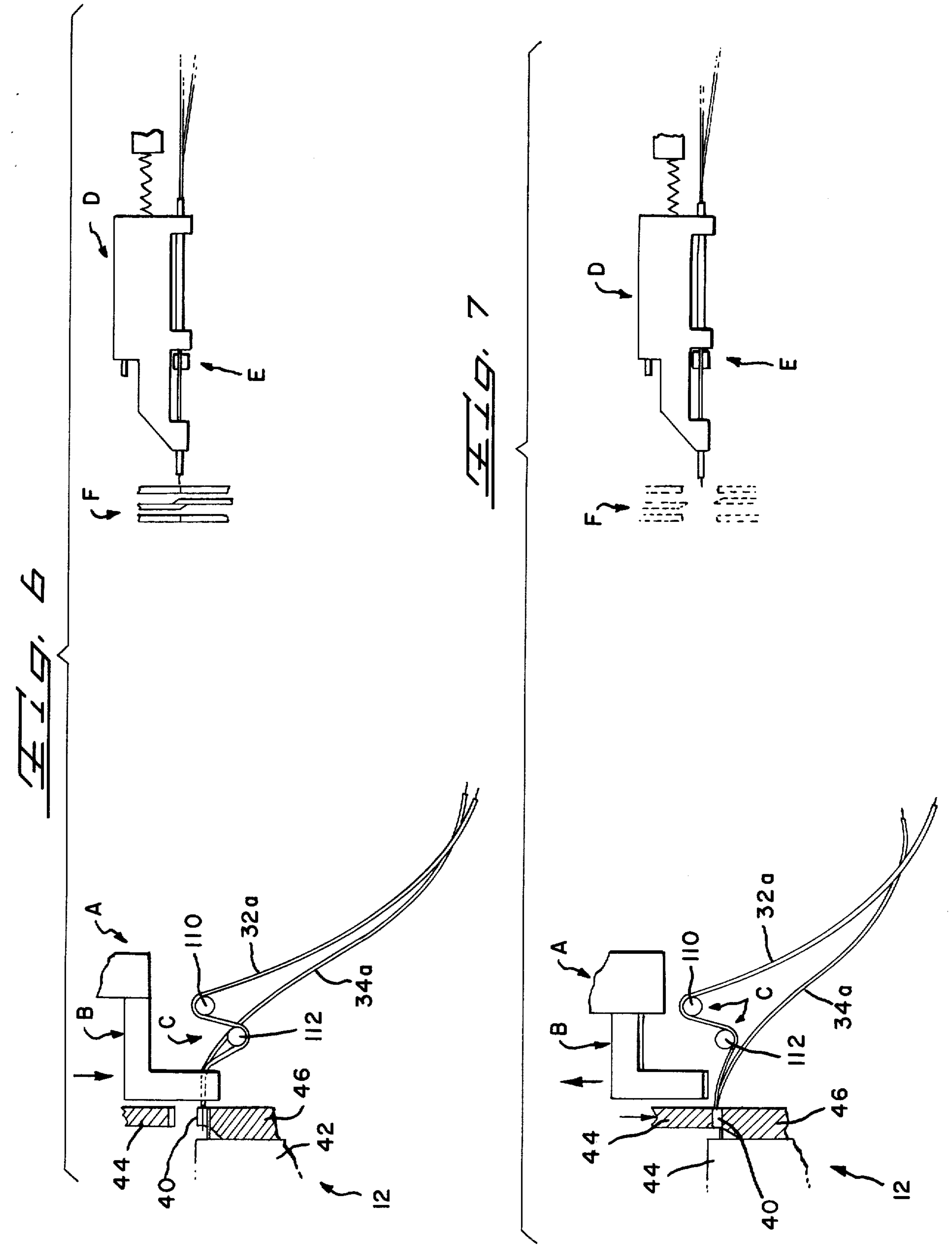
Figure 8:
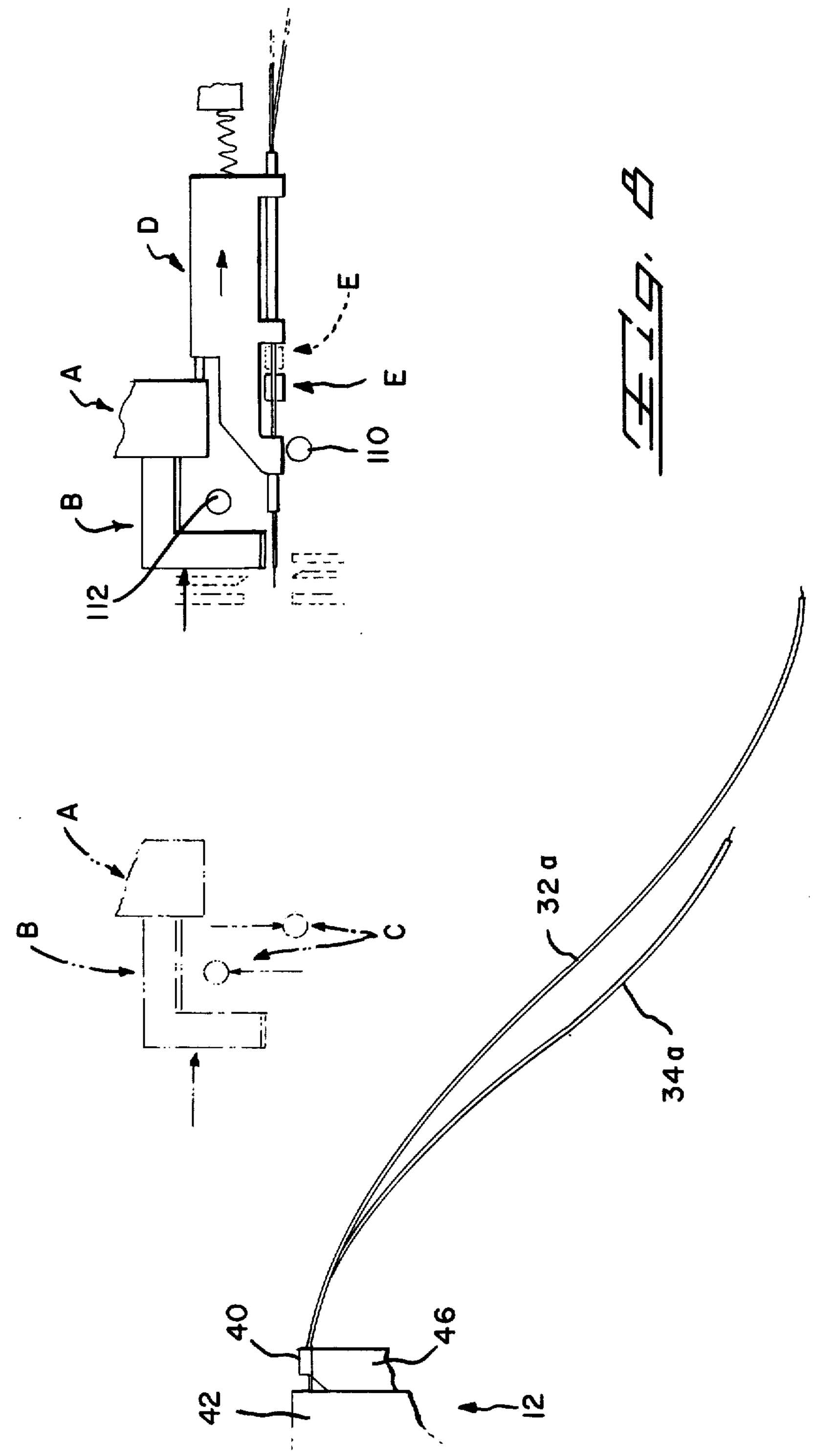

The leading end portions of the cut wires **32*a*, 34*a* are now deposited at the receiving station by moving the wire clamp means downwardly relative to the carriage means A and the receiving station as indicated in FIG. 6. The receiving station with which this machine may be advantageously associated may be a station of a conveyor, at which station the bared leading end of the cut wires 32*a*, 34*a* are disposed in open barrel terminals 40 which extend outwardly of an electrical sub-assembly, which may be a bobbin 42 carried by the conveyor, the conveyor being arrested at the receiving station so that the side walls of the open barrel terminals 40 can be crimped about the bared wires by a crimper 44 which is moved downwardly against an anvil 46, the details of the crimper 44 and anvil 46** not being material to the present invention.

After the crimper 44 has been brought down to bear against the anvil 46 it will be maintained in its down position as the wire clamp means B releases the leading end of the cut wires and is raised as indicated in FIG. 7. As the wire clamp means B is being raised and as it starts its rearward movement towards its retracted position the cutting and stripping means F will be opened and moved to its inoperative position, this being shown in broken lines in FIG. 7. As the wire clamp means continues its rearward movement to its retracted position the wire engaging rollers carried by the wire engaging means C will be shifted in a direction opposite to the direction they were shifted during the extension of the wire clamp means, and the wire gripper means E will be shifted from its rear position indicated by broken lines in FIG. 8 to its forward position indicated by the full lines in FIG. 8. Continued rearward movement of the carriage A, which carries the wire clamp means, and the wire engaging means, will cause the carriage A to bear against one end of the shiftable wire support D and when it initially contacts the shiftable wire support, the wire clamp means, and the wire engaging means will be disposed in a raised position as can be seen from FIG. 8. As the cycle is completed the wire clamp means is shifted rearwardly and downwardly to the retracted position shown in FIG. 9, this movement of the wire clamp means B causing corresponding rearward movement of the shiftable wire support D. The wire gripper means E will be maintained in their closed position until the shiftable wire support D has attained its rearward retracted position, this causing the leading end of the cut and stripped wires to be projected forwardly of the forward end of the shiftable wire support an amount sufficient to be engaged by the wire clamp means, the leading end portions of the supply wires now being disposed in an engaging zone forward of one end of the support. Prior to the completion of the cycle of operation the forward end of the supply wires 32, 34 are engaged by the wire clamp means and the wire gripper means E are opened. There is only a very small interval of time between the time the shiftable wire support is moved rearwardly and the time the leading ends of the wires are engaged, and during this small interval of time the wires maintain their proper orientation which has been imparted to them by the shiftable wire support.

RECIPROCAL CARRIAGE MEANS

Figure 12:
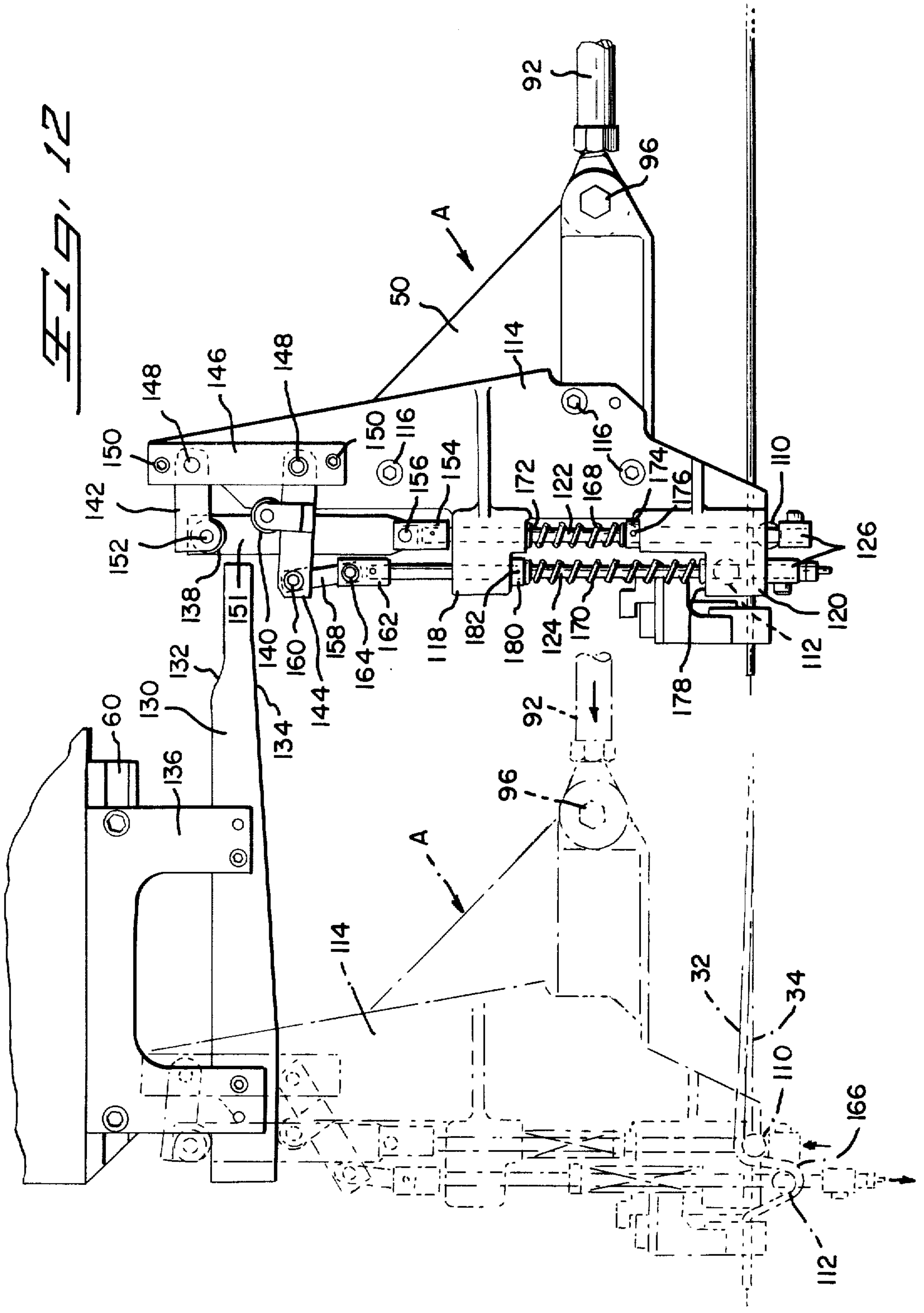
FIG. 12 is an enlarged right side view of a portion of the machine shown in FIG. 11, this view illustrating a reciprocal carriage means which carries a wire clamp means and a wire engaging means and showing these parts in full lines in the FIG. 1 position and in broken lines in the FIG. 3 position.
Figure 13:
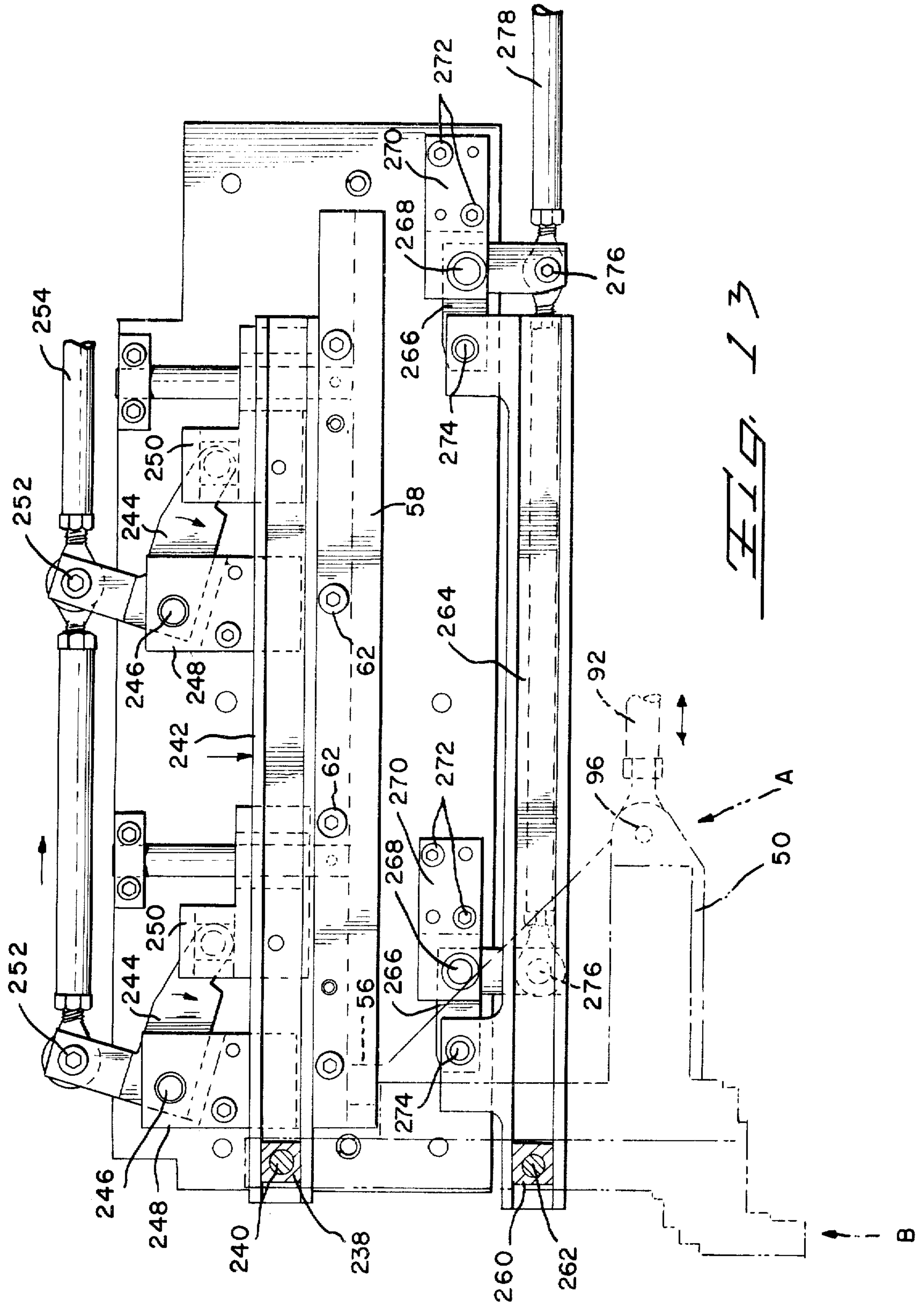
FIG. 13 is a right side view of a portion of the frame of the machine showing various guide tracks which support the reciprocal carriage means, this view illustrating the disposition of the guide tracks when the reciprocal carriage is in its FIG. 6 position.

Referring now principally to FIGS. 11, 12, 13, and 14, the reciprocal carriage means includes a casting 50, best shown in outline form in FIG. 13. (In FIG. 13 the wire engaging means C is not shown mounted on the casting.) The casting 50 is provided with an upper lateral extension 52 (FIG. 14), the extension receiving a vertically extending shaft 54 which extends upwardly above the upper surface of the extension 52. A guide block or shoe 56 is carried by the shaft 54, the guide block 56 being received within a guide rail 58 that is rigidly secured to the stationary main frame 60 of the machine 10 by cap screws 62. The casting 50 is also provided with lower lateral extension means 64 which carries a member 66 having an inner cylindrical bearing surface, the member 66 riding upon a cylindrical guide rail 68. The cylindrical rail 68 is secured to the upper surface of a bracket 70, which is in turn secured to the main frame 60. The member 66 is slotted at its lower end to receive the bracket 70 as can best be seen from FIG. 14. The guide block 56 and member 66 permit the casting to be reciprocated on the main frame of the machine between a forward extended position and a rear retracted position and maintains the carriage in proper orientation with respect to the machine.

The carriage A is reciprocated by cam operated linkage means which include a bell crank 72 (FIG. 11) which is pivotally secured as at 74 to the main frame of the machine, one end of the bell crank carrying a cam follower 76 which engages one of the cams 30, and the other end of the bell crank adjustably carrying a bracket 78 which is secured to one end of a first link 80 by a pivot pin 82. (By adjusting the bracket 78 the stroke of the carriage can be varied.) The other end of the link 80 is in turn pivotally interconnected to an intermediate portion of a second link 84 by means of a pivot pin 86. One end of the second link 84 is pivotally secured to the main frame of the machine by a pivot shaft 88 which passes through a bearing block 90. The other end of the second link 84 is in turn pivotally interconnected to a third link 92 by another pivot pin 94, and the other end of the third link is pivotally secured to one end of the casting 50 by pin 96. It can be appreciated from an inspection of FIG. 11 that as the cam follower 76 is moved away from the center line of the shaft 28 that the carriage A will be moved to its forward extended position. Similarly, as the cam follower is moved towards the center line of shaft 28 the casting 50 of the reciprocal carriage means A will be caused to be moved to its rear or retracted position. An air cylinder 98, which is interconnected to a source of low pressure air, has its anchor end mounted on the main frame of the machine and carries a rod 100 which is interconnected with the outer end of one arm of the bell crank by a pin 102. The cylinder assembly 98, 100 normally biasing the cam follower 76 upwardly into constant engagement with the cam track engaged by the cam follower 76.

WIRE ENGAGING MEANS

The wire engaging means C, which are best shown in FIGS. 10 and 12, includes a pair of wire engaging rollers 110, 112 which are mounted on the carriage means A in such a manner that they can be vertically shifted relative to each other in opposite directions. The rollers are disposed in a position spaced away from the wires and on opposite sides of the wires when the carriage means A is at its retracted position, as can best be seen from FIGS. 1 and in full lines in FIG. 12, and the rollers 110, 112 are moved in opposite directions across the path of a selected wire to form a bight in the selected wire as the carriage means is advanced to its extended position. In this respect it should be noted that the rollers 110, 112 are so disposed with respect to the wires that they will engage only one selected wire. The wire engaging rollers 110, 112 are mounted on a sub-frame 114 which is in turn secured to the casting 50 by fasteners 116. The sub-frame is provided with forwardly extending upper and lower extensions 118, 120, respectively, each of the extensions 118, 120 being provided with spaced apart vertically extending bores which receive push rods 122, 124. The lower end of each of the push rods 122, 124 carries a laterally extending bracket 126 (FIG. 10) which has adjustably secured thereto at an end remote from the push rod a vertically extending bracket 128 to which is journalled one of the rollers 110, 112. The rollers are caused to be moved upwardly or downwardly by a cam bar 130 having opposed upper and lower cam surfaces 132, 134, respectively, the cam bar 130 being interconnected to the stationary main frame 60 by a bracket 136. The rollers 110, 112 will be shifted vertically as the carriage A and sub-frame 114 are moved between forward extended and rear retracted positions. To this end cam followers 138, 140 are provided, the cam followers being adapted to engage the upper and lower cam surfaces 132, 134, respectively. The cam followers 138, 140 are mounted on upper and lower laterally extending arms 142, 144, one end of each of the arms being in turn pivotally secured to a mounting bracket 146 by pivot pins 148, the mounting bracket in turn being secured to the sub-frame 114 by fasteners 150. The other end of the upper arm 142 is in turn connected to the push rod 122 by a link 151, the upper end of the link being pivotally secured to the arm 142 by the pivot pin 152 which carries the cam follower 138, and the lower end of the link 151 is secured to an extension 154 of the push rod 122 by a pivot pin 156. The other end of the laterally extending arm 144 is similarly connected to the push rod 124 by a link 158, the upper end of which is pivotally interconnected to the outer end of the arm 144 by a pivot pin 160 and the lower end of the link being in turn connected to an extension 162 of the push rod 124 by a pivot pin 164. As can be seen from an inspection of FIG. 12, as the carriage A and sub-frame 114 are moved from their retracted full line position the cam followers 138, 140 will be brought into initial engagement with the cam surfaces 132, 134, respectively, and continued movement of the carriage A and sub-frame 114 to the extended broken line position will cause the wire engaging rollers 110, 112 to be moved upwardly and downwardly, respectively, to form a bight 166 in a selected wire 32. The cam followers 138, 140 are held against the cam surfaces 132, 134, once initial contact has been made, by biasing the push rods and their associated cam followers towards the cam surfaces, the biasing action being imparted by springs 168, 170 which are associated with push rods 122, 124 respectively. The upper end of the compression spring 168 will bear against a lower surface 172 of the upper extension 118 and the lower end of the spring 168 will bear against a collar 174 which is secured to the push rod 122 by a fastener 176. Similarly, the lower end of the spring 170 will bear against an upper surface 178 of the lower extension 120 and the upper end of the spring 170 will bear against a collar 180 which is in turn secured to the push rod 124 by a fastener 182. As the carriage moves from its broken line position shown in FIG. 12 to its full line position the springs, acting through their associated collars, will continue to bias the cam followers 138, 140 into contact with the upper and lower cam surfaces 132, 134 until the collars 174 and 180 contact surfaces of the extensions 120, 118, respectively, this movement of the carriage and sub-frame 114 causing the wire engaging rollers to be moved from their operative position to their inoperative position.

WIRE CLAMP MEANS

Figure 14:
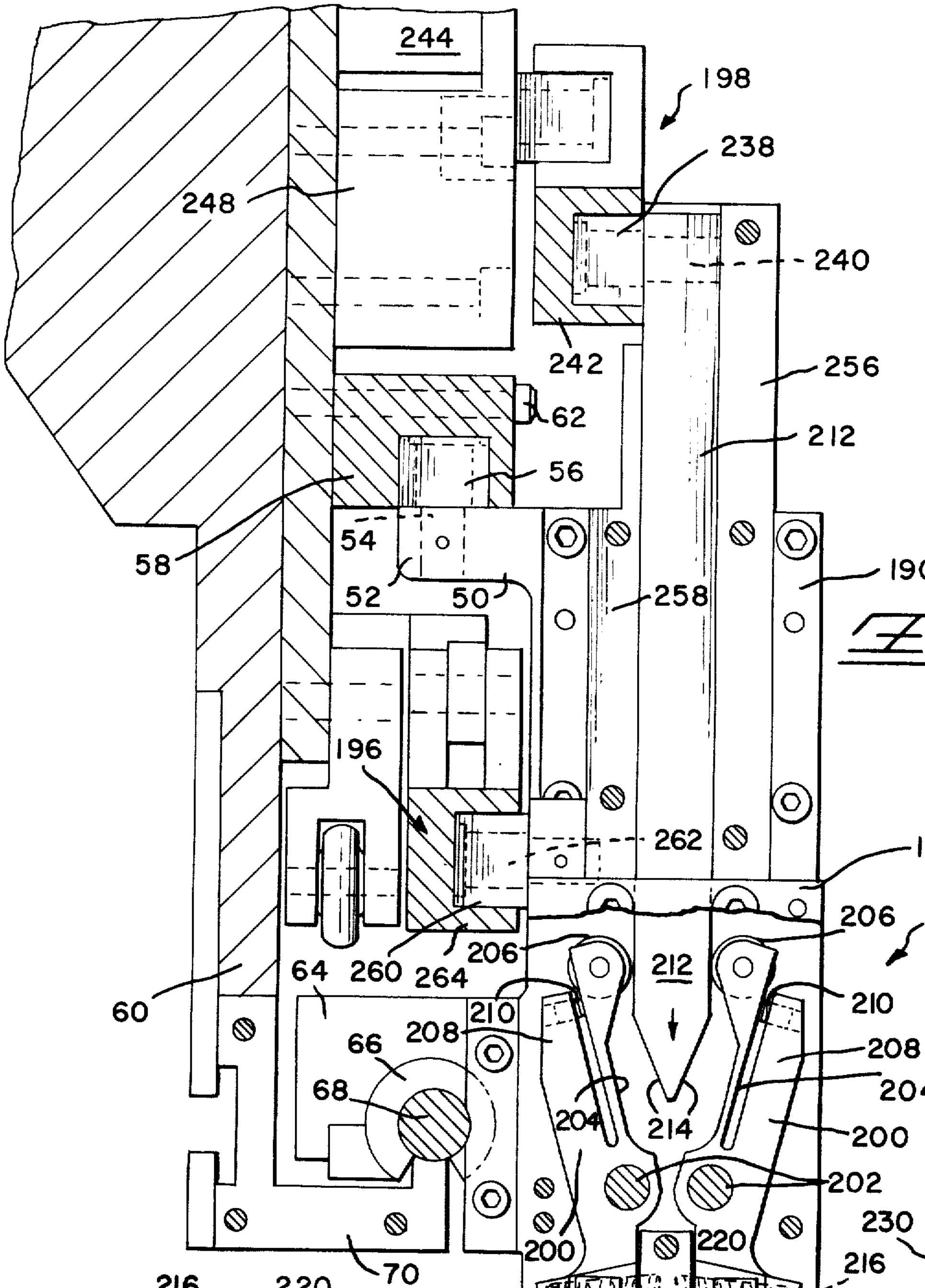
FIG. 14 is a front end view of a portion of the machine, this view being taken generally along lines 14—14 in FIG. 11, the wire engaging means being omitted for purposes of clarity.
Figure 14:
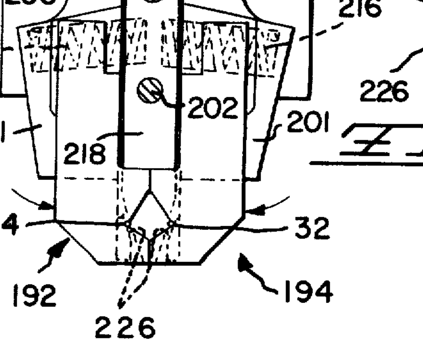
Figure 15:
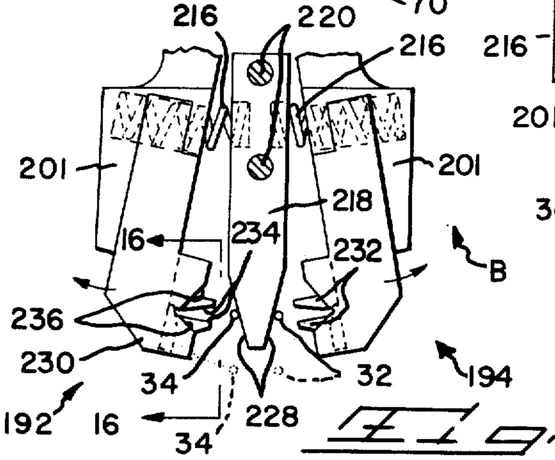
FIG. 15 is a fragmentary front view showing the jaws of the wire clamp means immediately before the leading ends of wires are engaged.
Figure 16:
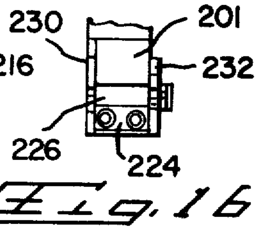
FIG. 16 is a side view of the jaws of the wire clamp means, this view being taken generally along the lines 16—16 in FIG. 15.

Referring principally to FIGS. 14 and 16, the wire clamp means B includes a vertically shiftable sub-frame 190 which is mounted in guide tracks (not shown) for vertical shifting movement relative to the carriage casting 50, the guide tracks being of generally conventional construction. The sub-frame 190 carries left and right jaw assemblies indicated generally at 192 and 194, respectively, the jaw assemblies being shiftable between a closed position shown in FIG. 14 and an open position shown in FIG. 15. Means are provided to shift the sub-frame and the jaws vertically, the vertical shifting means being indicated generally at 196. In addition, separate jaw actuating means are provided for causing the jaws to be opened and closed, the jaw actuating means being indicated generally at 198.

Each of the jaw assemblies 192, 194 include a principle portion indicated at 200, and an L-shaped extension portion 201. Each of the principle portions is supported for pivotal movement about pivot pins 202 carried by the shiftable sub-frame 190. Each of the principle portions 200 has a flexible arm 204 formed integral therewith, and each of the flexible arms 204 carries a cam follower roller 206. Each of the principle portions also includes a rigid overhanging portion 208 which carries an adjustable set screw 210 which bears against the outer surface of the associated flexible arm 204 when the cam followers 206 are engaged by a vertically shiftable cam 212, the vertically shiftable cam having opposed cam surfaces 214 which engage the rollers 206. When the vertical shiftable cam is moved to its lower position, shown in FIG. 14, the jaw assemblies will be biased to their closed position, and when moved to an upper position, not shown, the jaws will be biased to an open position. When the cam 212 is moved upwardly the cam followers 206 will be moved towards each other by compression spring means which are provided to normally bias the jaw assemblies 192, 194 to their open position. In this regard, it should be observed that recesses are provided in each of the extension portions 201, each of the recesses receiving one end of one of the compression springs 216. In addition an anvil 218, which is secured to the sub-frame 190 by fasteners 220, is also provided with opposed recesses, the other end of each of the compression springs 216 being received in one of the opposed recesses.

Each of the L-shaped extension portions 201 carries a vertically adjustable block 224, the blocks having inclined inner surfaces 226 which cooperate with inclined surfaces 228 of the anvil 218 to clamp the wires 32, 34. As the anvil 218, which is rigidly secured by the fasteners 220 to the sub-frame 190, can be vertically shifted relative to the extension portions 201, and as the blocks 224 are also vertically adjustable relative to the extension portions, the spacing between the center lines of the wires 32, 34 may be varied.

The wires are properly positioned between the clamping surfaces 226, 228 by means of front and rear fingers 230, 232, respectively. Each of the finbers 230, 232 has a V-shaped opening or notch which initially engages the wire, the inclined inner surfaces of the V-shaped notches camming the wires into a centered position as shown in FIG. 14. As the rear fingers 232 are disposed closely adjacent the wire support D, it is possible to utilize a narrow V-shaped notch, the inner surfaces 234 of the narrow V-shaped notch of the rear members engaging the wires if they are disposed above or below their plane of proper orientation and either lifting or depressing the wires a sufficient amount so that the forward ends of the wires, which are spaced further away from the wire support can be properly engaged by the inner surfaces 236 of the open V-shaped notches of the front fingers for proper orientation between the clamping surfaces 226, 228.

As previously noted, the cam 212 can be vertically shifted. To this end, a shoe or slid block 238 is rigidly secured to one side of the cam 212 by a fastener 240, the shoe 238 being received within a vertically shiftable guide track 242. The guide track is caused to be vertically shifted by means of a pair of bell cranks 244, (FIG. 13), the bell cranks 244 rocking about pivots 246 carried by brackets 248 which are in turn secured to the stationary main frame 60. One end of each of the bell cranks is interconnected with the guide track 242 by interconnecting structure 250 and the other end of each of the bell cranks 244 is pivotally secured by spaced apart pivots 252 to a longitudinally shiftable rod assembly 254. The rod assembly 254 is in turn connected with one of the cams 30 in such a manner that the jaw assemblies 192, 194 may be opened and closed at the proper times during the cycle of the machine. The cam 212 is supported for vertical shifting movement within a channel in the sub-frame 190, the channel being in part defined by vertically extending side frame members 256, 258 which are part of the sub-frame 190.

The sub-frame 190 is caused to be moved within the vertically extending guide track in a manner similar to the manner in which the jaws are caused to be opened and closed. Thus, the sub-frame 190 carries a shoe or slide block 260 which is secured to the sub-frame by a fastener 262, the slide block being received within a vertically shiftable guide track 264. The guide track 264 is supported by spaced apart bell cranks 266 (FIG. 13) which are journalled about pivots 268 carried by bracket 270, the bracket 270 being in turn secured to the stationary main frame 60 by fasteners 272. One end of each of the bell cranks is interconnected with the guide track 264 by interconnecting means 274 and the other end of each of the bell cranks is pivotally secured by spaced apart pivots 276 to a rod assembly 278. The other end of the rod assembly is in turn interconnected with one of the cams 30 for proper vertical shifting of the guide track 264 during the cycle of the machine.

As brought out above, the leading ends of the cut wires 32a, 34a are moved downwardly after their trailing ends have been stripped to position the stripped leading ends between spaced apart sidewalls of an open barrel terminal at the receiving station. After the sidewalls of the terminal have been crimped about the bared ends of the leading wires it is then necessary to raise the wire clamp means an amount in excess of the amount which it was moved down to position the wires within the open terminals in order for the various parts of the wire clamp means to clear the assembly during rearward movement of the wire clamp means. Once the carriage starts its rearward movement the wire clamp means could be moved down to its initial operative position. However, it has been found desirable to maintain the wire clamp means in its raised position until the rear end of the anvil 218 has moved beyond the leading end of the new supply wire and then to subsequently move it downwardly. FIG. 15 shows the relationships between the wire clamp means B and the wires when the wire clamp means is in its raised position and also in its operative position, the raised position relationship being indicated by the wires shown in broken lines, and the operative position relationship being indicated by the wires shown in full lines. It should be appreciated that if the leading ends of the wires 32, 34 were askew and if the wire clamp means was in its operative position rather than in its raised position, than there then would be a much greather likelihood that the ends would be contacted by the wire clamp means as it moves to its fully retracted position.

SHIFTABLE WIRE SUPPORT

Referring now principally to FIGS. 23, 24, and 25, the shiftable wire support B includes a shiftable member 280 which is mounted for reciprocal movement on a mounting member 282 which is in turn secured to the stationary frame 60 by fasteners 284. The mounting member 282 is provided with two spaced apart laterally outwardly projecting portions 286, each of the portions 286 being provided with bushings 288. In this regard, it should be observed that the shiftable member 280 is provided with a generally rectangular recess indicated by the broken lines 290, the recess receiving the front portion 286. A cylindrical recess is provided in the shiftable member 280, forward of the recess 290, the cylindrical recess receiving the forward end of a cylindrical rod 292 in snug relationship, the forward end of the rod 292 being secured in place in the cylindrical recess by a set screw 294. An intermediate portion of the rod 292 is securely supported by a wall 296 disposed to the rear of the recess 290. Thus, the rod 292 is securely mounted in the shiftable member 280. One portion of the rod is disposed within the forward bushing 288 and the rear end of the rod is supported in the rear bushing 288. The rod 292 acts as the principle means by which the shiftable member 280 is mounted on the mounting frame 282 for sliding movement between a forward extended position shown in FIG. 24 and a rear retracted position shown in FIG. 23. A shoe 298 prevents the shiftable member 280 from rotating about the axis of the rod 292, the shoe 298 being mounted on the upper surface of the member 280 and riding within a track formed by an overhanging portion of the mounting frame 282 and a plate 300 which is secured to the overhanging portion by fasteners 302. This construction can best be seen from FIG. 25. The shiftable member 280 is normally biased to its forward extended position by a compression spring 304 which is disposed about one end of a rod 306, the rear end of the rod 306 extending into a recess 308 on the mounting frame member 282. One end of the spring 304 bears against the bottom 310 of the recess 308 and the other end of the spring bears against a nut 312 on an intermediate portion of the rod. The forward end of the rod extends through a recess 314 between one of the laterally outwardly extending portions 286 and the shiftable member 280, and the forward end of the rod is provided with an abutment surface 316 for the reasons which will be more fully brought out below. The forward position of the rod 306 can be adjusted by rotating the rod 306, a threaded portion of the rod being engaged by a nut 318 which is in turn secured to shiftable member 280.

The shiftable member 280 is adapted to support a pair of wires and to this end it is provided with a forward extension 320 which carries a pair of thin wall guide tubes 322, 324, each of which receives one of the pair of wires 32, 34. Furthermore, another portion of the shiftable member 280 carries two additional guide tubes 326, 328, the additional guide tubes being mounted in place by mounting plates 330 which are held in place by flat head screws 332. Between the guide tubes 322, 324 and the guide tubes 326, 328 there is provided a recessed area indicated generally at 334, the recessed area receiving a portion of the wire gripper means in the manner shown in FIGS. 1 through 9.

The normal position of the parts is shown in FIG. 24 and it can be seen that the compression spring 304 acting between the surface 310 and the nut 312 will bias the reciprocal support member 280 to its forward extended position until a stop 336, which is secured to the rearward end of the rod 292 by a set screw 338, contacts the rear surface 340 of the rear laterally outwardly extending portion 286. When the reciprocal carriage means A and the wire clamp means B are moved to the retracted position an abutment surface 342 of the carriage casting 50 will contact the abutment surface 316. Movement of the carriage A from the position wherein the abutment surface 342 initially contacts the abutment surface 316 to the fully retracted position shown in FIG. 23 will cause corresponding rearward shifting movement of the wire support means 280. As can be seen from a comparison of the full line position shown in FIG. 8 and the position shown in FIG. 9, the pair of wires 32, 34 are held from movement relative to the frame 60 by the wire gripper means E, and the forward end of the wires will be caused to be projected forwardly of the guide tubes 322, 324. By employing the guide tubes 322, 324 it is possible to so arrange the parts that the guide tubes can actually extend a small distance into the cutting and stripping mechanism F to insure proper orientation of the wires carried by the tubes prior to the cutting and stripping operation. While this feature is not shown in the drawings, it should be appreciated that the mechanism which carries the cutting and stripping blade extends to either side of the blades, and that, by employing the guide tubes, the guide tubes can be inserted into the mechanism to a point just behind the rear side of the rear stripping blade.

WIRE GRIPPER MEANS

Referring principally to FIG. 22 but also to FIGS. 17, 18, and 26, the wire gripping means E includes first and second jaw means indicated generally at 350 and 352, respectively. The first jaw means 350 are mounted on a tool saddle 353 which is adjustably interconnected to the stationary main frame means 60, the first jaw means being mounted for movement between forward extended and rear retracted postions, and the second jaw means 352 are pivotally mounted on the first jaw means in a manner which will be more fully brought out below. Compression spring means 354 are disposed between the jaw means 350 and 352 and normally bias the jaw means 350, 352 to their open position shown in FIGS. 1, 2, and 9; and means, indicated generally at 356, are provided to selectively bias the jaw means to their closed position.

The first jaw means 350 includes a principle portion indicated generally at 358, the principle portion being supported on the stationary frame 60 for longitudinal reciprocal movement. To this end the principle portion is provided with two spaced apart vertically extending portions 360 (FIG. 26) which carry bushings 362, the bushings being slidably disposed about a guide rod 364 which is secured in spaced apart locations to the frame 60. In addition, the principle portion 358 carries a shoe 366 (FIG. 22) which is slidably received within a guide track 368 which is also secured to the tool saddle 353. A cylindrical rod 370, having a reduced end portion

371, is received within spaced apart aligned cylindrical apertures of the principle portion 358 and is pinned in place by means of a roll pin or the like 372. The forward portion (to the right in FIG. 26) of the principle portion 358 is provided with a vertically extending slot 374 open at the bottom, the portions to either side of the slots 374 having cylindrical apertures which receive the reduced end portion 371 of the rod 370.

The lower jaw means include a principle portion 376 which carries a bushing 378, the principle portion 376 being disposed within the slot 374 with the bushing being journalled about the reduced end portion 371 of the rod 370.

The principle portions 358 and 376 are each provided with cylindrical recesses 380 and 382 to the right side of the reduced end portion 371 of the rod 370 as viewed in 22. The compression spring 354 is disposed in the cylindrical recesses 380, 382 and normally biases the jaw means to their open position.

Upper and lower jaw extensions 384, 386, respectively, are removably mounted on the sides of the principle portions 358, 376, the jaw extensions 384, 386 being operable to engage the pair of wires 32, 34 when the lower jaw means 352 is biased to a closed position. The means 356 which selectively biases the lower jaw means to its closed position with respect to the upper jaw means includes a tubular push rod 388 having a lower engaging surface 390 which rides on the surface of a roller 392, the roller being journalled about a pin 394 carried by the left hand side (as viewed in FIG. 22) of the principle portion 376 of the lower jaw means. Mounted within the tubular push rod 388 is a cylindrical rod 396, the rod being provided with a vertically extending slot 398. A pin 400 extends through the slot 398 and is secured to either side of the tubular push rod 388. The cylindrical rod 396 is normally biased to its upper position by a compression spring 402 which extends between the lower surface 404 of the cylindrical rod and the bottom surface 406 of the tubular push rod. A bell crank 408 (FIG. 17) is pivotally mounted as at 410 on the stationary main frame 60 of the machine, and one end 412 of the bell crank normally bears against the upper surface 414 of the cylindrical rod 396. When the end 412 of the bell crank 408 is moved to its lower position shown in full lines in FIG. 22, the compression spring 402 will be compressed forcing the surface 390 downwardly to cause the lower jaw 352 to pivot about the cylindrical rod 370 to dispose the upper and lower jaw extensions 384, 386 in their wire engaging position. In this connection, it should be noted that the spring rates of the spring 354 and 402 are so selected that when the end 412 of the bell crank is in its lower position the jaw means will be caused to be closed. However, when the end 412 of the bell crank is in its raised position indicated by the broken lins in FIG. 22, the spring 354 will override the spring 402 causing the jaw means to be moved to their open position.

Adjustable means are provided to limit the movement of the second jaw means to its closed position to prevent undue force from being applied to the wires which are to be gripped, the adjustable means comprising the set screw 416 which is threaded into an extension 418 of the principle portion 358, the set screw being locked in an adjusted position by a lock nut 420. A hardened pin 422 is press fitted into an aperture within the principle portion 376, the lower end of the hardened pin being adapted to contact the upper surface of the set screw when the jaws are in their closed position as shown in FIG. 22.

The other end 424 of the bell crank 408 is pivotally secured by means of a pivot pin 426 to a split clamp 428 which is in turn secured to a shift rod 430 by means of fasteners 432. One end of the shift rod is connected with one of the cams 30 in such a manner that the jaw means will be moved between their open and closed position at the appropriate time during the cycle of operation of the machine, the manner in which the shift rod 430 is interconnected to one of the cams 30 not being material to the present invention.

Means are provided to shift the wire grippers or jaw means between forward and rear positions. The wire gripper shifting means includes a link 434 (FIG. 26), one end of which is secured about a pivot pin 436 which is carried by the principle portion 358 of the upper jaw, and the other end of the link 434 is interconnected to one of the cams 30 in a manner not material to the present invention, the cam imparting the desired longitudinal shifting movement to the jaw means. It should be noted at this point that only a relatively small longitudinal movement is imparted to the wire grippers, this movement being necessary to strip the insulation from the leading end of the new supply wires after they have been cut. This movement is customarily within the range of 6 to 7 millimeters, but can be varied as required. The surface 390 has sufficient longitudinal extent that it will be maintained in engagement with the roller 392 during such shifting movement.

CUTTING AND STRIPPING MEANS

Referring principally to FIGS. 19 through 21, but also to FIGS. 17, 18 and 27, the cutting and stripping means includes a sub-frame in the form of a slide 440 which is mounted for transverse movement relative to the stationary main frame 60 and a pair of upper and lower jaws indicated generally at 442, 444, the jaws being mounted on the sub-frame for movement with the sub-frame in a direction generally perpendicular to the length of the wires 32, 34, the jaws also being mounted for movement towards and away from each other in a direction also normal to the length of the wires and also generally perpendicular to the direction of movement of the slide 440. As can best be seen from FIGS. 17 and 27, the sub-frame 440 is provided with a pair of oppositely disposed extensions 446 which are received within a track formed by tool saddle 353 and track forming members 450 secured to the tool saddle 353, the tool saddle 353 being adjustably secured to the stationary main frame 60. As can be seen from a comparison of FIGS. 19 and 20 the sub-frame or slide 440 can be moved between a retracted position shown in FIG. 19 and an extended position shown in FIG. 20. To this end, a pair of rods 452 having threaded ends 454 are disposed within cylindrical recesses 456 of the sub-frame, the threaded ends 454 being screwed into threaded apertures 458. Compression springs 462 are disposed about each of the rods 452, one end of each of the compression springs bearing against the end 460 of a cylindrical recess 456, and the other end of each of the springs 462 bearing against surface 464 of a plate 466. The ends 468 of the rods 452 remote from the threaded ends 454 extend through two spaced apart cylindrical apertures in plate 466. Abutment surfaces 470 are carried by the ends of the rods 468, and the abutment surfaces will bear against the other surfaces 472 of the plate 466 when the parts are disposed in the position shown in FIGS. 19 and 20. The abutment surface may be the inner surface of a nut and washer assembly screwed onto a threaded extension of the rod.

The slide is provided with a recessed area 474 between the portions which form the cylindrical recess 456, the recessed area 474 receiving a member 476. The left hand end of the member 476 (as viewed in FIG. 19) is secured to the plate 466 by fasteners 478. A slot 480 is formed in the member 476, and the slide 440 is also provided with an opening in communication with the slot 480. A pin 482 is carried by the member 476 and passes through the slot. A bearing member 484, which has a generally rectangular outer surface as can best be seen in FIG. 18, is journalled about the pin 482. A rock arm 486, which has one end secured to a rock shaft 488, has a bifurcated outer end 490 which is disposed within the slot 480 about the bearing 484. By causing the rock shaft 488 to be rotated it should be apparent that there would be corresponding movement of the end 490 of the rock arm and similar corresponding movement initially of the member 476 and of the slide 440. Thus, when the parts are disposed in the position shown in FIG. 19, movement of the end 490 of the rock arm in the direction indicated by the arrow 492 in FIG. 19 will cause the slide 440 to move from its retracted position to its extended position shown in FIG. 20. It should be ovserved at this point that the rock arm can continue to move in the same direction from the position shown in FIG. 20 to the position shown in FIG. 21, but during this movement of the rock arm movement of the slide 440 is arrested. The movement of the slide is arrested by a stop 494 which is carried at one end of a screw 496 which is threaded through an aperture in the slide 440, the screw being held securely in place by a locking nut 498. The stop 494 will contact an abutment 500 formed on the saddle 353 to limit further movement of the sub-frame 440 to the right during continued movement of the rock arm 486 in the direction indicated by the arrow 492.

Further movement of the rock arm 486 after the parts have attained their position shown in FIG. 20 will cause the jaws 442, 444 to be moved from their open position shown in FIG. 20 to their closed position shown in FIG. 21. The upper and lower jaw assemblies 442, 444 have principle positions 502, 504, respectively, both of these portions being provided with means whereby they may be journalled for rocking movement about the axis of a pivot rod 506. To this end, it should be observed that the slide 440 is provided with spaced apart sidewall members 508 (FIG. 27) which carry bushings 510, the end of the pivot rod 506 being received within the bushings 510. The upper jaw is provided with two spaced apart downwardly extending portions 512 which are also journalled about the bushings 510, and the principle portion 504 of the lower jaw is provided with an upwardly extending intermediate portion 514 which is secured to the pivot rod 506 by means of a fastener 516. The left side (as viewed in FIGS. 19 through 21) of each of the principle portions 502, 504 are provided with substantially identical cam follower mechanisms, these cam follower mechanisms including flexible arms 518 which carry cam follower rollers 520, the flexible arms 518 in turn abutting against adjustable set screws 522 of overhanging portions 524 of the principle portion. To the right of the pivot rod 506 each of the principle portions 502, 504 is provided with a recess (no number) which receives a compression spring 526. The compression spring 526 will bias the cam followers into engagement with opposed cam surfaces 528 formed on a leading end of a member 476, the opposed cam surfaces having a wedge shaped configuration. It should be obvious, that as the member 476 is moved from the position shown in FIG. 20 to the position shown in FIG. 21 that as the slide 440, and therefore the pivot rod 506, cannot advance further to the right, the wedge shaped cam surfaces 528 will force the cam followers 520 apart to in turn cause compression of the spring 526 and to move cutting and stripping mechanisms 530 and 532 towards each other, the cutting and stripping mechanisms 530, 532 being carried by the right hand ends of the principle portions 502, 504, respectively. The cutting and stripping mechanisms 530, 532 do not per se form a part of this invention, but it should be observed that each of the cutting and stripping mechanisms 530, 532 carries a cutting blade and spaced apart wire strippers. Upper and lower cutting blades 534, 536, respectively, (shown only in outline form in FIGS. 1 through 9) serve to cut the wires 32, 34 as the cutting and stripping mechanism 530, 532 are moved towards each other. In addition, insulation stripping blades 538 serve to sever the insulation about the wires and to strip the insulation from the ends of the wires as the ends of the wires are pulled away from each other in the manner shown in FIG. 5.

Referring now principally to FIG. 17, the rock shaft 488 is journalled for rocking motion within a cylindrical portion 540 of the stationary main frame 60, the upper end of the rock shaft 488 being secured to one end of a crank arm 542 which rests on a thrust bearing 544, the other end of the crank arm being interconnected to a shift rod 546 in a generally conventional manner. When the parts are in the position shown in FIG. 19 and the shift rod 546 is caused to be moved in the direction indicated by the arrow 548, the member 476 will be caused to be moved in the direction indicated by the arrow 492. Initial movement will shift the parts from the position shown in FIG. 19 to the position shown in FIG. 20, and continued movement of the crank arm in the direction of the arrow 492 will then cause the jaws 502, 504 to be closed to position the cutting and stripping mechanisms 530, 532 in the operative cutting and stripping position. In achieving this compound motion it should be observed that less force is required to compress the springs 462 to impart movement to the slide from the position shown in FIG. 19 to the position shown in FIG. 20 than is required to compress the spring 526 to close the jaws 530, 532. Therefore, the slide will move from its retracted position shown in FIG. 20 before the jaws will be closed. When the rock arm 486 is moved from the position shown in FIG. 21 to the position shown in FIG. 19 the jaws 530, 532 will initially open, and then the slide 440 will be shifted to the left.

The operation of the apparatus which has been fully described above should be apparent to those skilled in the art from a consideration of the detailed description above taken in conjunction with the preceding summary of operation. It should again be observed, however, that the lengths of the wires 32, 34 are varied relative to each other as the wires are moved to the receiving station 12 by engaging one of the wires 32 by the roller 112 to form a bight therein and cutting an intermediate portion of both of the wires 32, 34 between the portion which is engaged to form a bight and the source of supply of the wires. It should also again be observed that the leading or forward end portion of the wires 32, 34 after they have been cut and stripped are initially substantially fully supported in the guide tubes 322, 324 on the shiftable support B in a controlled relationship to maintain proper orientation of the leading ends of the wires 32, 34 with respect to each other. Thus, after the leading ends have been cut and stripped the ends are supported by the guide tubes in an oriented manner with only a very small increment of the end portions extending beyond the guide tubes. If a portion of the wires 32, 34 having insulation thereon were to extend beyond the guide tubes 322, 324, the insulation on the wires might cause the wires to sag, or to distort due to the plastic memory of the insulation, which memory may have been imparted to the plastic insulation by the manner in which the wires were stored. The leading ends of the wires are exposed in an unsupported manner only immediately prior to the time they are engaged, the leading end of the wires being exposed by shifting the guide tubes 322, 324 rearwardly as the surface 342 of the carriage casting 50 contacts the surface 316 of the shiftable support. As the time interval between the time the leading ends of the wires are exposed and the time they are engaged is very short, the leading end portions of the wires have insufficient time to distort before the wire clamp means B engages the insulation of the wires immediately behind the stripped end portions. By engaging the leading end portions of the wires in the foregoing manner it is possible to maintain accurate orientation of the leading ends of the wires as they are picked up by the wire clamp means and then to transfer the leading end portions of the wires to a receiving station and to place them at the receiving station in an accurate manner. The foregoing is further achieved by the employment of the novel wire clamping means which maintains wires 32, 34 in accurate relationship with respect to each other.

While a preferred structure in which the principles of the present invention have been incorporated are shown and described above, it is to be understood that the invention is not to be limited to the particular details, shown and described above, but that, in fact, widely differing means may be employed in the practice of the broader aspects of this invention.

What is claimed is:

1. A method for feeding a plurality of wires of differing lengths to a receiving station, said method comprising the steps of:

initially supporting the leading end portion of each of a plurality of wires at a first location, each of said plurality of wires being initially interconnected to a source of supply;

engaging the leading end portion of each of said plurality of wires and simultaneously moving the leading end portion of each of said plurality of wires away from said first location to a second location adjacent a receiving station;

engaging an intermediate portion of a selected wire after the leading end portion of each of the plurality wires has been moved away from said first location to cause the length of the selected wire between the leading end and the first location to be increased relative to the other wires of said plurality of wires; and cutting said plurality of wires at a location between the intermediate portion of the selected wire and the first location to cause the cut plurality of wires to be of differing lengths.

2. The method set forth in claim 1 wherein spaced apart opposed sides of the intermediate portion of the selected wire are engaged and moved in opposed directions generally normal to the length of the wire whereby the length of the selected wire is increased relative to the other wires of said plurality of wires.

3. The method set forth in claim 1 wherein the intermediate portion of the selected wire is engaged and moved in a direction generally normal to the length of the wire at the same time the leading end portion of each of the wires is being moved away from said first location to a second location adjacent the receiving station.

4. A method of feeding and cutting lengths of wires which are to be deposited at a receiving station and engaging new wires which are to be subsequently fed and cut, said method comprising the following steps:

providing movable wire clamp means and a support which is shiftable between an extended position and a retracted position, the support slidingly confining the leading end of a supply wire, and the support being held in a retracted position when the leading end of the supply wire is initially engaged by wire clamp means at an engaging zone forwardly of the forward end of the support;

moving the wire clamp means and the engaged leading end of the supply wire away from the engaging zone a first amount to position the leading end of the supply wire adjacent a receiving station and also causing the forward end of the support to be moved away from its retracted position through the engaging zone and a second amount less than the first amount;

cutting a portion of the supply wire adjacent the forward end of said support to form cut and new supply wires, a substantial portion of the leading end portion of the new supply wire being confined from distortion and held in an oriented position by the support;

releasing the leading end of the cut wire at the receiving station and then moving the wire clamp means towards the engaging zone until it is in a position closely adjacent the forward end of said support;

holding said supply wire from movement while moving the wire clamp means to the engaging zone and simultaneously moving the support to its retracted position to cause the leading end of the supply wire to be projected forwardly of the forward end of the support; and engaging the leading end portion of the supply wire which has been projected forwardly of the forward end of the support by the wire clamp means at the engaging zone before the leading end of the supply wire has time to distort.

5. The method set forth in claim 4 further characterized by the following additional steps of:

cutting insulation to either side of the cut portion of the wire by moving insulation severing blades into a cutting position;

stripping insulation from either side of the cut portion by maintaining the insulation severing blades in their cutting position while moving the cut and new supply wires in opposed first and second directions, respectively, to strip the insulation from opposed ends of the cut and supply wires; and moving the leading end of the supply wire in a direction opposite to said second direction to reposition the cut end of said supply wire in said oriented position before the wire clamp means attains the position closely adjacent said one end of the support.

6. An apparatus for feeding a plurality of wires of differing lengths to a receiving station, said apparatus comprising:

support means operable to initially support the leading end portion of each of a plurality of wires which extend away from a source of supply;

clamp means operable in an initial position to engage each of the leading end portions and to simultaneously move the leading end portions away from the support means to a location adjacent said receiving station;

engaging means operable to engage a selected wire of said plurality of wires between the clamp means and the support means, said engaging means causing the length of the selected wire between the clamp means and the support means to be increased relative to the length of the other wires of said plurality of wires between the clamp means and the support means; and cutting means operable to cut said plurality of wires between said support means and said engaging means whereby the cut wires are of differing lengths.

7. The apparatus set forth in claim 6 in which said engaging means includes means operable to form a bight in said selected wire.

8. The apparatus set forth in claim 6 in which said engaging means includes a pair of laterally spaced apart opposed wire engaging rollers, said rollers initially being disposed at locations spaced away from the sides of said selected wire when clamp means is disposed in said initial position, said engaging means further including means operable to move said rollers in opposed directions generally normal to the length of said selected wire to engage said wire in spaced apart locations and to move the engaged portions of said wire generally normal to the length of said wire.

9. The apparatus set forth in claim 6 further characterized by the provision of reciprocal carriage means movable between an initial position adjacent said support means and another position adjacent said receiving station, said clamp means and said engaging means being carried by said reciprocal carriage means.

10. The apparatus set forth in claim 9 further characterized by the provision of cam means, there being relative movement between the cam means and the reciprocal carriage means during said movement of the carriage means; and in which said engaging means includes a plurality of wire engaging rollers disposed on opposite sides of said selected wire, cam follower means, and linkage means interconnecting said cam follower means with said wire engaging rollers, said cam follower means being engagable with said cam means during movement of said carriage means whereby said plurality of wire engaging rollers are moved by said linkage means in such a manner as to cause the wire engaging rollers to engage said selected wire as the carriage means is moved away from said support means.

11. The apparatus set forth in claim 10 wherein said cam means comprises a stationary cam bar having upper and lower opposed cam surfaces, and said cam follower means includes a pair of cam followers, one of said cam followers being engagable with the upper cam surface and the other of said pair of cam followers being engagable with the lower cam surface.

12. The apparatus set forth in claim 10 in which said engaging means includes a sub-frame mounted on said carriage means, said linkage means includes a pair of laterally extending arms pivotally secured to said sub-frame, each of said pair of arms carrying one of said plurality of cam followers, and a pair of spring biased push rods supported by said sub-frame, the upper end of each of said push rods being interconnected to a laterally outwardly extending portion of an associated arm, said push rods being operable to bias said pair of cam followers into engagement with said cam means, and the lower end portion of each of said push rods carrying at least one of said plurality of wire engaging rollers.

13. A wire feed apparatus comprising:

a frame;

wire clamping means mounted on said frame for relative shifting movement between extended and retracted positions, said wire clamping means being operable to initially engage the leading end portion of a wire when the wire clamping means is in its retracted position, to maintain engagement of the wire as the wire clamping means is shifted to the extended position, and to release the leading portion of the wire when the wire clamping means is in the extended position whereby the wire is caused to be fed;

wire support means operable to slidably support said wire, said wire support means being mounted on said frame for relative shifting movement between an extended position and a retracted position and operable to be shifted to its retracted position in response to movement of said wire clamping means to its fully retracted position; and wire gripping means mounted on said frame and operable to selectively grip said wire and hold it from relative movement with respect to said frame as said wire support means is shifted to its retracted position whereby the leading end portion of the wire is caused to be projected forwardly of one end of said wire support means in proper orientation an amount to be properly engaged by the wire clamping means as it completes its movement to its retracted position.

14. The wire feed apparatus set forth in claim 13 in which said wire support means is normally spring biased to its extended position.

15. The wire feed apparatus set forth in claim 14 in which said wire support means and said wire clamping means are provided with first and second abutment means, respectively, the parts being so arranged and constructed that the abutment means will be brought into contact with each other during movement of said wire clamping means to its fully retracted position, further movement of the wire clamping means towards its fully retracted position after the abutment means have been brought into contact with each other causing corresponding movement of the wire support means.

16. The wire feed apparatus set forth in claim 13 in which said wire gripper means includes first jaw means mounted for sliding movement on said frame;

second jaw means pivotally interconnected to said first jaw means and movable relative to first jaw means between open and closed positions;

means operable to normally bias second jaw means to its open position;

means selectively operable to bias said second jaw means to its closed position; and adjustable means to limit the movement of the second jaw towards its closed position whereby wires of differing diameters may be securely held between the first and second jaw means without unduly damaging the wires.

17. A wire feeding apparatus comprising:

a frame;

support means mounted on the frame for shiftable movement between extended and retracted positions, said support means being operable to slidably support the leading end portion of a wire;

gripper means operable to hold said wire from movement relative to said frame during movement of the support means from its extended position to its retracted position;

gripper mounting means operable to mount said gripper means on said frame;

clamp means and means mounting the clamp means on said frame for shifting movement between extended and retracted positions, said clamp means being operable to engage said leading end portion of said wire when in a retracted position and to move the engaged leading end portion away from the support means as the clamp means is moved to its extended position;

shifting means operable to shift said support means to its retracted position as said clamp means is moved to its fully retracted position to cause a leading end portion of said wire to be projected forwardly of the leading end of said support means whereby said clamp means accurately engages the wire; and means mounted on said frame and operable to cut an intermediate portion of said wire adjacent the leading end of said support means after said leading end portion has been moved away from the support means to form an additional leading end portion which does not initially project forwardly of said support means an amount sufficient to be properly engaged by said clamp means.

18. An apparatus for accurately feeding the leading end of a plurality of cut wires to a receiving station, each of said cut wires having initially been interconnected to a source of supply; said apparatus comprising:

a frame;

support means mounted on the frame for shiftable movement between extended and retracted positions, said support means being operable to slidably support the cut leading end portions of a plurality of supply wires which extend away from a source of supply;

gripper means mounted on the frame and selectively operable to hold said plurality of supply wires for movement relative to said support means;

clamp means and means interconnecting said clamp means with said frame and operable to move the clamp means from an initial retracted position adjacent the leading end of said support means through intermediate positions to a final extended position at said receiving station, said clamp means being operable to engage said cut leading end portions of said plurality of supply wires when said clamp means is in said initial retracted position and to move said leading end portions in a generally linear path away from said support means as said clamp means is moved towards its final extended position;

wire cutting means interconnected with said frame and operable to cut an intermediate portion of said wires closely adjacent said support means when said clamp means is in a first intermediate position to form a plurality of cut wires carried by said clamp means, said plurality of supply wires having new leading ends oriented by said support means for subsequent engagement of said clamp means and extending beyond the leading end of the support means an amount insufficient to be properly engaged by said clamp means; and first and second abutment means on said support means and said clamp means, respectively, and so arranged and constructed that as the clamp means is moving to its retracted position the first and second abutment will be brought into contact with each other before said clamp means attains its fully retracted position, and further movement of the clamp means to its fully retracted position will cause corresponding movement of the support means whereby the new leading end portions of said supply wires will be projected forwardly of the leading ends of the support means an amount sufficient to be properly engaged by the clamp means.

19. The apparatus set forth in claim 18 in which said wire cutting means is associated with a pair of oppositely disposed insulation cutting means, and in which the clamp means is moved forwardly from a first intermediate position to a second intermediate position to strip the cut insulation from the trailing end of said cut wires, and further characterized by the provision of means operable to move said gripper means rearwardly to strip insulation from the new leading ends.

20. The apparatus set forth in claim 19 in which said wire cutting means and said pair of oppositely disposed insulation cutting means includes structure mounted on a pair of jaws movable towards each other as said wires and insulation are cut, said jaws being mounted on said frame for movement in a direction normal to the movement of the jaws towards each other, the parts being arranged and constructed that said jaws are in a position spaced away from the path of the leading ends of the wires when said clamp means is moved from its initial retracted position.

21. The apparatus set forth in claim 18 in which the means operable to move the clamp means first moves the clamp means away from its fully retracted position after the leading end of the wires have been engaged by the clamp means in a first linear path to a position adjacent said receiving station and subsequently moves the clamp means towards its retracted position in a second generally linear path spaced above the first path, said clamp means being moved downwardly at the completion of the movement of the clamp means towards its fully retracted position.

22. In a wire feed apparatus including a main frame, a wire support mounted on said main frame and adapted to slidably support a wire, and wire clamping means mounted on said frame for longitudinal movement from a retracted position immediately adjacent said wire support to an extended position remote from said support;

the combination therewith of cutting and stripping means adapted to cut an intermediate portion of said wire in a location between the wire support and the extended position of the wire clamping means and to strip insulation from opposed ends of said cut wire, said cutting and stripping means including a sub-frame mounted for transverse movement on said main frame between retracted and extended positions, a pair of jaws pivotally mounted on said sub-frame and movable between open and closed positions, said jaws carrying cutting and stripping structures, and single actuator means movable from an initial position through an intermediate position to a final position, said actuator means being operable to move the sub-frame from its retracted position to its extended position as the actuator is moved from its initial position to its intermediate position, and the actuator then being operable to move the jaws from their open position to their closed position as the actuator is moved from its intermediate position to its final position.

23. In a wire feed apparatus including a main frame, a wire support mounted on said main frame and adapted to slidably support a pair of wires, and a receiving station, the combination therewith of wire clamp means mounted on said frame for relative shifting movement between a forward extended position and a rearward retracted position, said wire clamping means being operable to initially engage the leading end portion of a pair of wires when the wire clamp means is in its retracted position, to maintain engagement of the pair of wires as the wire clamp means is shifted to the extended position, and to release the leading end portion of the pair of wires when the wire clamp means is in the extended position, said wire clamp means including a sub-frame mounted on said frame for movement between forward extended and rear retracted positions;

an anvil carried by said frame and having opposed wire engaging surfaces;

a pair of jaws pivotally mounted on said sub-frame for movement between open and closed positions, each of said jaws having a wire engaging surface in alignment with a corresponding wire engaging surface on the anvil when the jaws are in their closed position and each jaw also including front and rear wire centering members having generally V-shaped wire centering notches;

means operable to close said jaws to trap said pair of wires to either side of said anvil, each of said wires being held between one of the opposed surfaces of the anvil and the corresponding wire engaging surface of the jaw; and means operable to open said jaws.

24. The apparatus set forth in claim 23 in which said means operable to open said jaws are compression spring means which normally bias said jaws to an open position; and in which said means operable to close said jaws is a shiftable cam bar having opposed cam surfaces, each of said jaws being provided with a cam follower which is spring biased into engagement with said cam bar by said compression spring means.

25. The apparatus set forth in claim 23 in which said anvil is adjustable mounted on said sub-frame, said opposed surfaces of the anvil being disposed at an angle to each other, and in which each of the wire engaging surfaces of the jaws are on vertically shiftable blocks, said blocks being adjustably mounted on said jaws for movement relative to said wire centering members, the parts being so arranged and constructed that the spacing between the engaged pair of wires may be varied by adjusting the disposition of the anvil and said blocks.

* * * * *